US012682357B2

(12) United States Patent
Gupta et al.

(10) Patent No.: US 12,682,357 B2
(45) Date of Patent: Jul. 14, 2026

(54) FRAMEWORK FOR CYBER-PHYSICAL INTERACTION AWARE TEST CASE GENERATION TO IDENTIFY OPERATIONAL CHANGES

(71) Applicants:Sandeep Gupta, Phoenix, AZ (US); Aranyak Maity, Tempe, AZ (US); Ayan Banerjee, Gilbert, AZ (US); Imane Lamrani, Phoenix, AZ (US)

(72) Inventors: Sandeep Gupta, Phoenix, AZ (US); Aranyak Maity, Tempe, AZ (US); Ayan Banerjee, Gilbert, AZ (US); Imane Lamrani, Phoenix, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 555 days.

(21) Appl. No.: 18/202,224

(22) Filed: May 25, 2023

(65) Prior Publication Data

US 2023/0385847 A1 Nov. 30, 2023

Related U.S. Application Data

(60) Provisional application No. 63/345,754, filed on May 25, 2022.

(51) Int. Cl.
G06Q 30/018 (2023.01)
(52) U.S. Cl.
CPC ................................. G06Q 30/018 (2013.01)
(58) Field of Classification Search
None
See application file for complete search history.

(56) References Cited

U.S. PATENT DOCUMENTS 12,475,195 B2 * 11/2025 Osakabe ................. G06F 17/16
2010/0094611 A1 * 4/2010 Sankaranarayanan ......................
G01R 31/318357
703/22

OTHER PUBLICATIONS

A. A. Shukla, S. K. Mohalik and R. Badrinath, "Smart Contracts for Multiagent Plan Execution in Untrusted Cyber-Physical Systems," 2018 IEEE 25th International Conference on High Performance Computing Workshops (HiPCW), Bengaluru, India, 2018, pp. 86-94 (Year: 2018).*
L. Zhang, "Specifying and Modeling Automotive Cyber Physical Systems," 2013 IEEE 16th International Conference on Computational Science and Engineering, Sydney, NSW, Australia, 2013, pp. 603-610, doi: 10.1109/CSE.2013.95. (Year: 2013).*

(Continued)

*Primary Examiner* — Folashade Anderson
(74) *Attorney, Agent, or Firm* — Polsinelli PC

(57) ABSTRACT

The operational characteristics of a cyber-physical system (CPS) may deviate from the certified system due to intended (in case of cheating) or unintended (wear and tear) reasons. A computer-implemented certification system makes test case search aware of the multidimensional interactions between the cyber and physical subsystems and addresses practical dynamical system problems like Zeno behavior and dynamical model divergence. The system dynamically modulates an input search space by predicting and limiting input variations that can potentially cause divergence or Zeno behavior.

19 Claims, 15 Drawing Sheets

(56)                          References Cited

OTHER PUBLICATIONS

G. Barthe, P. R. D'Argenio, B. Finkbeiner, and H. Hermanns, "Facets of software doping," in Leveraging Applications of Formal Methods, Verification and Validation: Discussion, Dissemination, Applications, T. Margaria and B. Steffen, Eds. Cham: Springer International Publishing, 2016, pp. 601-608.

BBC News, "Volkswagen: The scandal explained," https://www.bbc.com/news/business-34324772, 2015.

S. Biewer, P. R. D'argenio, and H. Hermanns, "Doping tests for cyber-physical systems," ACM Transactions on Modeling and Computer Simulation (TOMACS), vol. 31, No. 3, pp. 1-27, 2021.

M. Contag, G. Li, A. Pawlowski, F. Domke, K. Levchenko, T. Holz, and S. Savage, "How they did it: An analysis of emission defeat devices in modern automobiles," in 2017 IEEE Symposium on Security and Privacy (SP). IEEE, 2017, pp. 231-250.

P. R. D'Argenio, G. Barthe, S. Biewer, B. Finkbeiner, and H. Hermanns, "Is your software on dope?" in European Symposium on Programming. Springer, 2017, pp. 83-110.

R. Dimitrova, M. Gazda, M. R. Mousavi, S. Biewer, and H. Hermanns, "Conformance-based doping detection for cyber-physical systems," in International Conference on Formal Techniques for Distributed Objects, Components, and Systems. Springer, 2020, pp. 59-77.

W. A. Rasheed, P. Goyal, and C. Joseph, "Model based control for a selective catalytic reduction (scr) system in an exhaust gas aftertreatment system for a diesel engine," in 2013 International Conference on Energy Efficient Technologies for Sustainability, 2013, pp. 744-749.

C. M. Schar, C. H. Onder, and H. P. Geering, "Control of an scr catalytic converter system for a mobile heavy-duty application," IEEE Transactions on Control Systems Technology, vol. 14, No. 4, pp. 641-653, 2006.

Y. Shoshitaishvili, R. Wang, C. Salls, N. Stephens, M. Polino, A. Dutcher, J. Grosen, S. Feng, C. Hauser, C. Kruegel et al., "Sok:(state of) the art of war: Offensive techniques in binary analysis," in 2016 IEEE Symposium on Security and Privacy (SP). IEEE, 2016, pp. 138-157.

W. Wang, Y. Gao, W. Sun, and C. Yang, "A realization for scr catalytic converter model based on matlab/simulink," in 2011 Asia-Pacific Power and Energy Engineering Conference. IEEE, 2011, pp. 1-4.

* cited by examiner

Figure 11A:
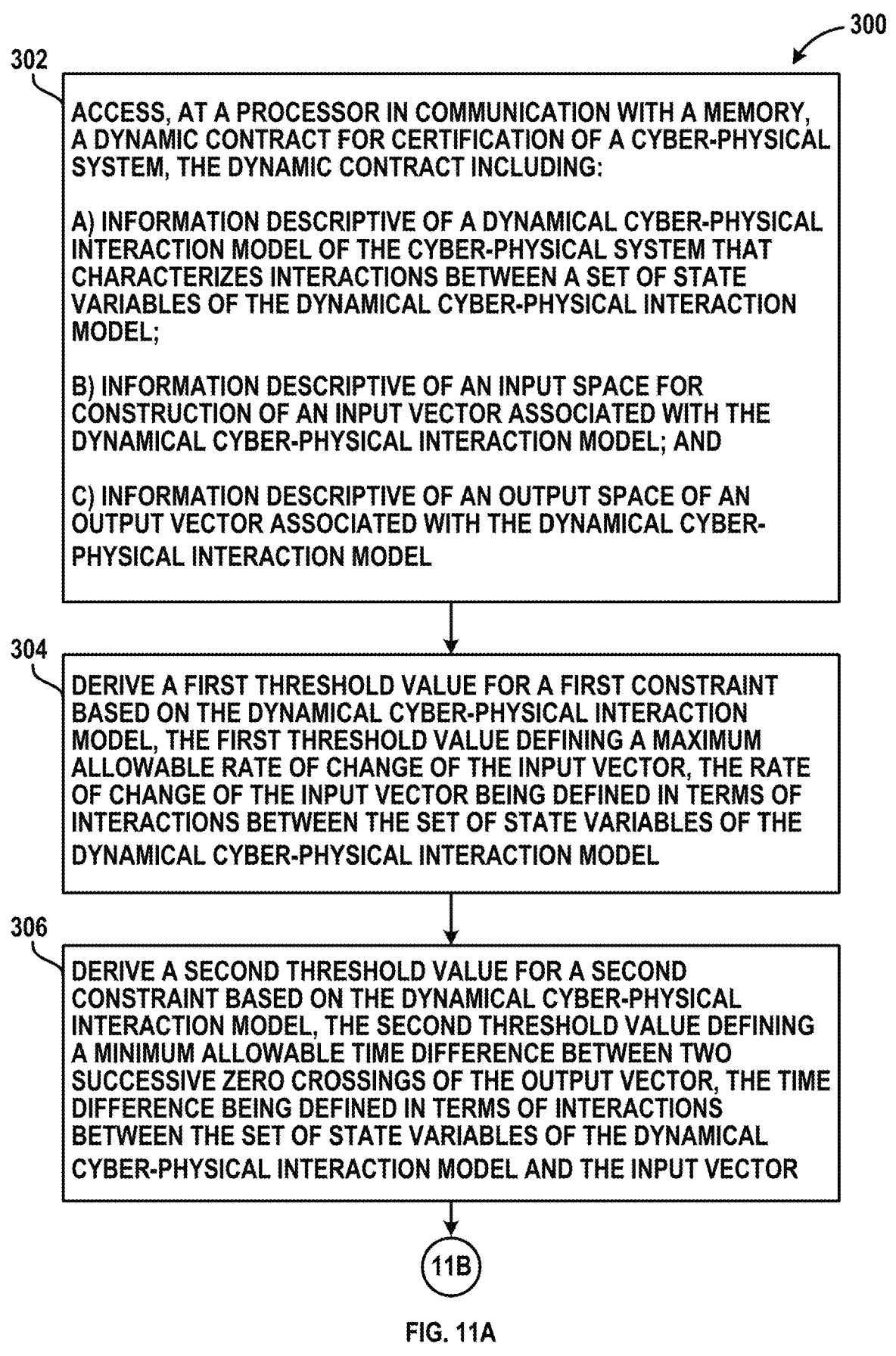

300

302

ACCESS, AT A PROCESSOR IN COMMUNICATION WITH A MEMORY, A DYNAMIC CONTRACT FOR CERTIFICATION OF A CYBER-PHYSICAL SYSTEM, THE DYNAMIC CONTRACT INCLUDING:

A) INFORMATION DESCRIPTIVE OF A DYNAMICAL CYBER-PHYSICAL INTERACTION MODEL OF THE CYBER-PHYSICAL SYSTEM THAT CHARACTERIZES INTERACTIONS BETWEEN A SET OF STATE VARIABLES OF THE DYNAMICAL CYBER-PHYSICAL INTERACTION MODEL;

B) INFORMATION DESCRIPTIVE OF AN INPUT SPACE FOR CONSTRUCTION OF AN INPUT VECTOR ASSOCIATED WITH THE DYNAMICAL CYBER-PHYSICAL INTERACTION MODEL; AND

C) INFORMATION DESCRIPTIVE OF AN OUTPUT SPACE OF AN OUTPUT VECTOR ASSOCIATED WITH THE DYNAMICAL CYBER-PHYSICAL INTERACTION MODEL

304

DERIVE A FIRST THRESHOLD VALUE FOR A FIRST CONSTRAINT BASED ON THE DYNAMICAL CYBER-PHYSICAL INTERACTION MODEL, THE FIRST THRESHOLD VALUE DEFINING A MAXIMUM ALLOWABLE RATE OF CHANGE OF THE INPUT VECTOR, THE RATE OF CHANGE OF THE INPUT VECTOR BEING DEFINED IN TERMS OF INTERACTIONS BETWEEN THE SET OF STATE VARIABLES OF THE DYNAMICAL CYBER-PHYSICAL INTERACTION MODEL

306

DERIVE A SECOND THRESHOLD VALUE FOR A SECOND CONSTRAINT BASED ON THE DYNAMICAL CYBER-PHYSICAL INTERACTION MODEL, THE SECOND THRESHOLD VALUE DEFINING A MINIMUM ALLOWABLE TIME DIFFERENCE BETWEEN TWO SUCCESSIVE ZERO CROSSINGS OF THE OUTPUT VECTOR, THE TIME DIFFERENCE BEING DEFINED IN TERMS OF INTERACTIONS BETWEEN THE SET OF STATE VARIABLES OF THE DYNAMICAL CYBER-PHYSICAL INTERACTION MODEL AND THE INPUT VECTOR

Figure 11B:
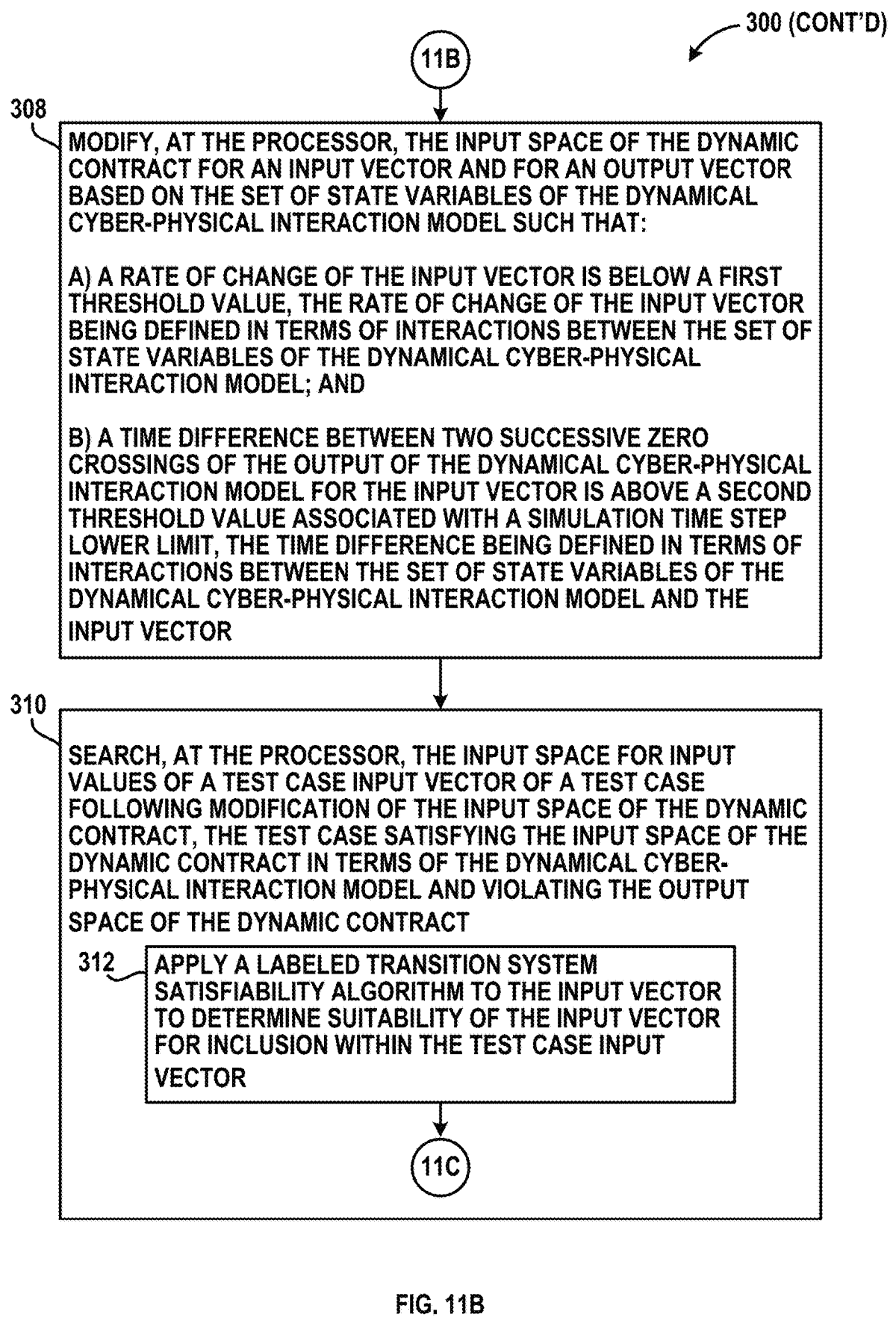

MODIFY, AT THE PROCESSOR, THE INPUT SPACE OF THE DYNAMIC CONTRACT FOR AN INPUT VECTOR AND FOR AN OUTPUT VECTOR BASED ON THE SET OF STATE VARIABLES OF THE DYNAMICAL CYBER-PHYSICAL INTERACTION MODEL SUCH THAT:

A) A RATE OF CHANGE OF THE INPUT VECTOR IS BELOW A FIRST THRESHOLD VALUE, THE RATE OF CHANGE OF THE INPUT VECTOR BEING DEFINED IN TERMS OF INTERACTIONS BETWEEN THE SET OF STATE VARIABLES OF THE DYNAMICAL CYBER-PHYSICAL INTERACTION MODEL; AND

B) A TIME DIFFERENCE BETWEEN TWO SUCCESSIVE ZERO CROSSINGS OF THE OUTPUT OF THE DYNAMICAL CYBER-PHYSICAL INTERACTION MODEL FOR THE INPUT VECTOR IS ABOVE A SECOND THRESHOLD VALUE ASSOCIATED WITH A SIMULATION TIME STEP LOWER LIMIT, THE TIME DIFFERENCE BEING DEFINED IN TERMS OF INTERACTIONS BETWEEN THE SET OF STATE VARIABLES OF THE DYNAMICAL CYBER-PHYSICAL INTERACTION MODEL AND THE INPUT VECTOR

310

SEARCH, AT THE PROCESSOR, THE INPUT SPACE FOR INPUT VALUES OF A TEST CASE INPUT VECTOR OF A TEST CASE FOLLOWING MODIFICATION OF THE INPUT SPACE OF THE DYNAMIC CONTRACT, THE TEST CASE SATISFYING THE INPUT SPACE OF THE DYNAMIC CONTRACT IN TERMS OF THE DYNAMICAL CYBER-PHYSICAL INTERACTION MODEL AND VIOLATING THE OUTPUT SPACE OF THE DYNAMIC CONTRACT

312

APPLY A LABELED TRANSITION SYSTEM SATISFIABILITY ALGORITHM TO THE INPUT VECTOR TO DETERMINE SUITABILITY OF THE INPUT VECTOR FOR INCLUSION WITHIN THE TEST CASE INPUT VECTOR (11C)

FIG. 11B 300 (CONT'D)

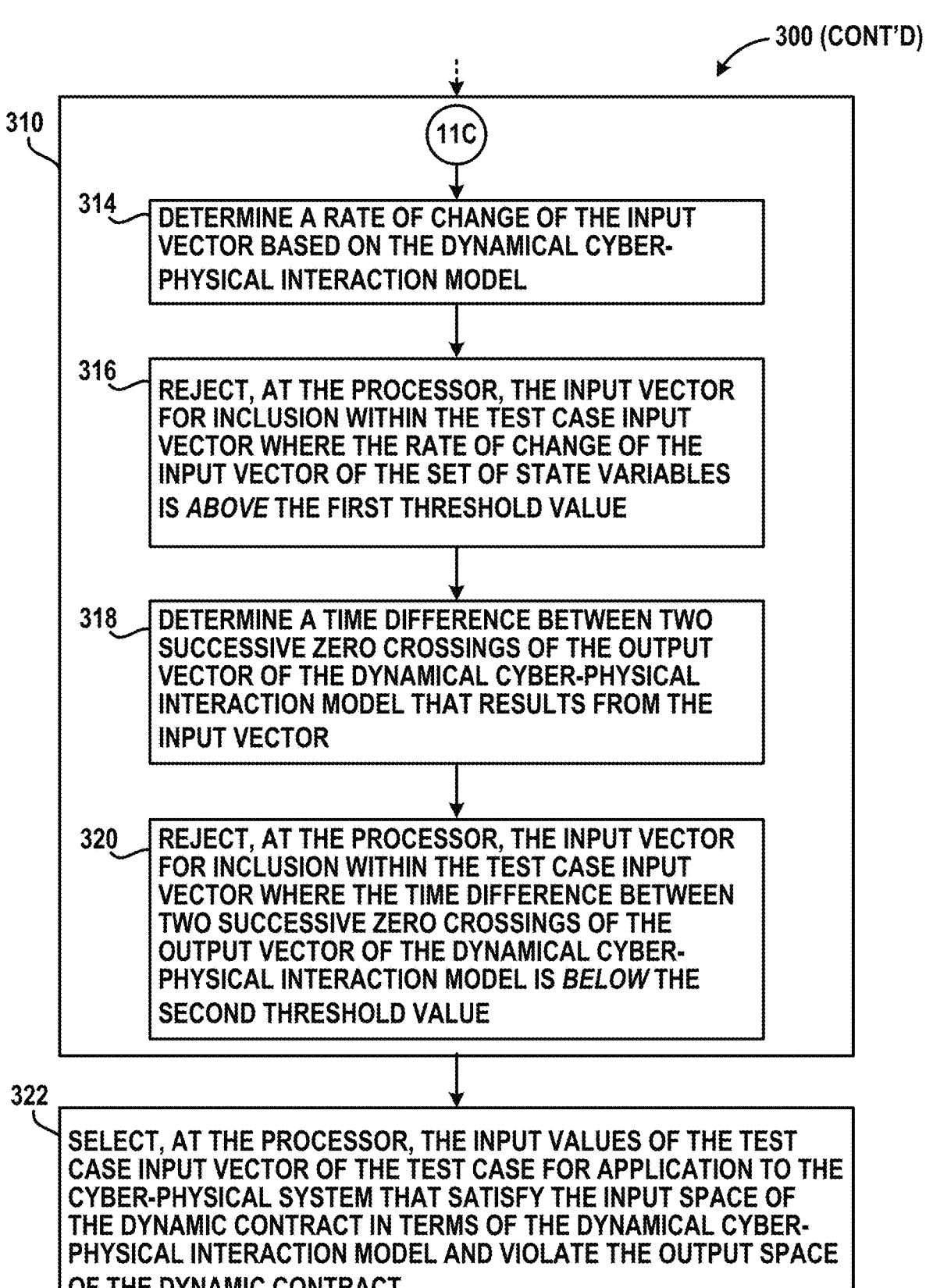

310

11C

314 — DETERMINE A RATE OF CHANGE OF THE INPUT VECTOR BASED ON THE DYNAMICAL CYBER-PHYSICAL INTERACTION MODEL

316 — REJECT, AT THE PROCESSOR, THE INPUT VECTOR FOR INCLUSION WITHIN THE TEST CASE INPUT VECTOR WHERE THE RATE OF CHANGE OF THE INPUT VECTOR OF THE SET OF STATE VARIABLES IS *ABOVE* THE FIRST THRESHOLD VALUE

318 — DETERMINE A TIME DIFFERENCE BETWEEN TWO SUCCESSIVE ZERO CROSSINGS OF THE OUTPUT VECTOR OF THE DYNAMICAL CYBER-PHYSICAL INTERACTION MODEL THAT RESULTS FROM THE INPUT VECTOR

320 — REJECT, AT THE PROCESSOR, THE INPUT VECTOR FOR INCLUSION WITHIN THE TEST CASE INPUT VECTOR WHERE THE TIME DIFFERENCE BETWEEN TWO SUCCESSIVE ZERO CROSSINGS OF THE OUTPUT VECTOR OF THE DYNAMICAL CYBER-PHYSICAL INTERACTION MODEL IS *BELOW* THE SECOND THRESHOLD VALUE

322 — SELECT, AT THE PROCESSOR, THE INPUT VALUES OF THE TEST CASE INPUT VECTOR OF THE TEST CASE FOR APPLICATION TO THE CYBER-PHYSICAL SYSTEM THAT SATISFY THE INPUT SPACE OF THE DYNAMIC CONTRACT IN TERMS OF THE DYNAMICAL CYBER-PHYSICAL INTERACTION MODEL AND VIOLATE THE OUTPUT SPACE OF THE DYNAMIC CONTRACT

FIG. 11C

FRAMEWORK FOR CYBER-PHYSICAL INTERACTION AWARE TEST CASE GENERATION TO IDENTIFY OPERATIONAL CHANGES

CROSS-REFERENCE TO RELATED APPLICATIONS

This is a U.S. Non-Provisional Patent Application that claims benefit to U.S. Provisional Patent Application Ser. No. 63/345,754 filed 25 May 2022, which is herein incorporated by reference in its entirety.

FIELD

The present disclosure generally relates to cyber-physical systems, and in particular, to a framework and associated methods for generating test cases for compliance testing of cyber-physical systems.

BACKGROUND

Present day autonomous systems are cyber-physical systems (CPS) that involve multi-dimensional interaction between the cyber machine and the operational environment. One of the key aspects of these autonomous systems is that interaction patterns change over the lifetime of usage.

Changes in CPS interaction patterns can be unintentional or intentional changes in the software configuration of the CPS controller. Unintentional changes can occur through mechanisms such as patching. Errors in the patching pipeline can potentially change the operational characteristics of the CPS controller software. Intentional changes in the software are observed in cheating scenarios, usually motivated by a desire to circumvent regulations. In one example, additional cheat software can be installed to detect when a CPS is not operating under test environments agreed on between a manufacturer and a certification entity.

It is with these observations in mind, among others, that various aspects of the present disclosure were conceived and developed.

BRIEF DESCRIPTION OF THE DRAWINGS

FIGS. 11A-11C are a series of process flow diagrams showing a method for implementation of the system of FIGS. 3A and 3B.

Corresponding reference characters indicate corresponding elements among the view of the drawings. The headings used in the figures do not limit the scope of the claims.

DETAILED DESCRIPTION

A computer-implemented system and associated methods for identifying operational changes in a cyber-physical system (CPS) are disclosed herein. In particular, the framework efficiently obtains parameters of "test cases" for CPS certification that can be feasibly replicated in real life and can be applied for cheating detection during CPS certification.

1. Introduction

Present day autonomous systems are CPSs that involve multi-dimensional interaction between the cyber machine and the operational environment. One of the key aspects of these autonomous systems is that interaction patterns change over the lifetime of usage. This is observed in critical systems such as automobiles, where a cheating software monitors when a vehicle is not in the emission testing cycle and drastically reduces urea injection in selective catalytic reduction (SCR) emission control system to increase the lifetime of diesel particulate filter (DPF) that in turn increases nitrogen oxides (NO r) emissions.

Changes in CPS interaction patterns can be unintentional or intentional changes in the software configuration of the CPS controller. Unintentional changes can occur through mechanisms such as patching. Errors in the patching pipeline can potentially change the operational characteristics of the CPS controller software. Intentional changes in the software are observed in cheating devices infamously employed by some vehicle manufacturers. Here an additional cheat software was installed to detect when the vehicle was not operating under test environments. The software tampers with the (NO r) emission set point of the urea injection controller. As a result, it significantly dampens urea injection, causing more emission but conserving urea. This can result in significant harm to the environment.

Test case generation to identify such unintentional or intentional changes in the operational characteristics is an important topic of recent research. The primary challenge is that comprehensive testing and monitoring of the system can only be done before deployment through a certification mechanism. Once it is deployed, continuous testing and monitoring cannot be performed or is limited due to exorbitant cost and inconvenience. In the certification mechanism, a testing cycle is established by the certifier which is made public and the manufacturer aims to build a CPS that satisfies regulatory requirements for the given test cycle.

Figure 1:
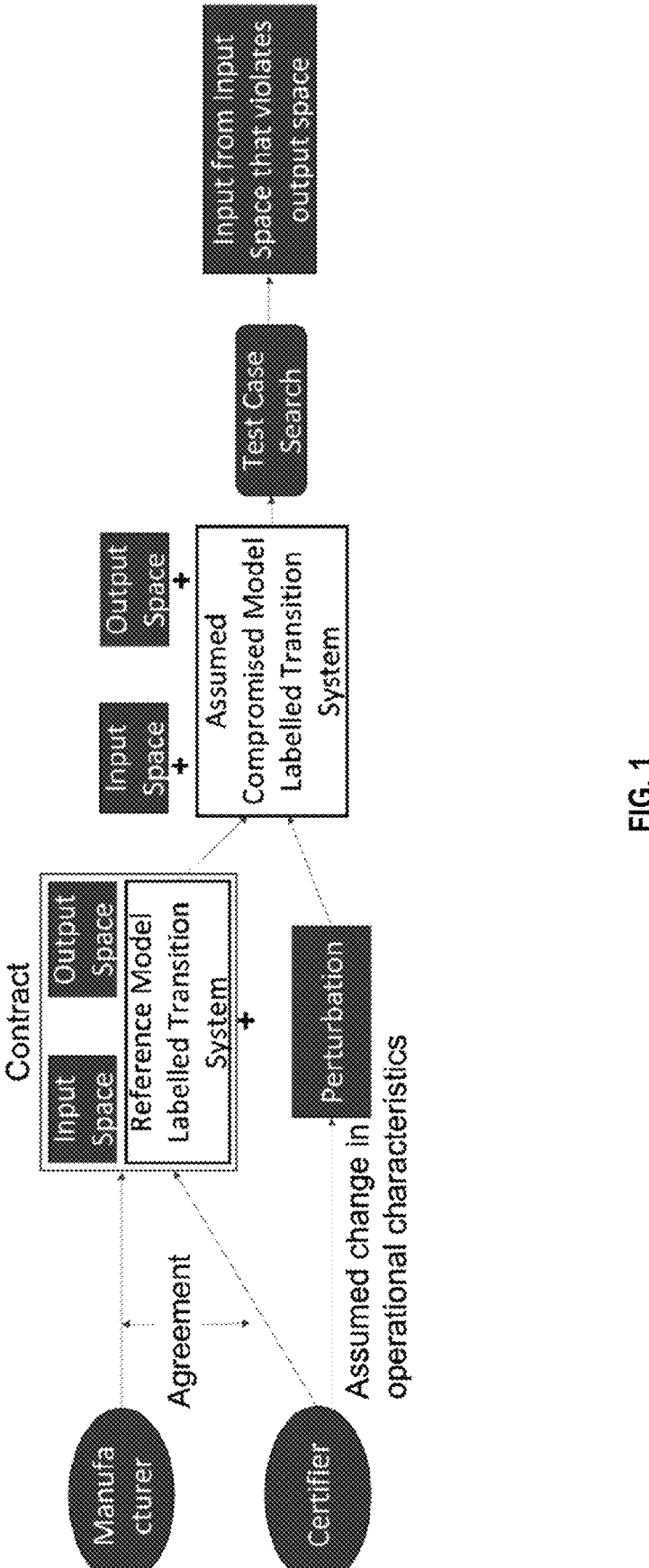
FIG. 1 is a simplified diagram showing a certification workflow for certification of a cyber-physical system.

Several researchers have proposed a modification to this test cycle-based certification approach to include perturbations within a contract, as depicted in FIG. 1. The main aim of the perturbation in this modified certification framework is to find a scenario where operational characteristics of the deployed CPS can be different from a reference model. In this modified certification mechanism (FIG. 1), the certification authority and manufacturer agree upon a contract, which includes:

a. a reference model of the implementation in a formal modeling framework such as a labeled transition system (LTS);

b. an input space, which can include a range of perturbations from the publicized test cycle; and c. an output space, which can include a range of outputs acceptable following the regulatory requirements.

The test case search algorithm then uses LTS satisfiability theory to determine a test case that is in the input space but violates the output space. The LTS includes an input labeled state transition system, where each state represents a decision by the cyber software such as the engine control unit (ECU) of an automobile. Such LTS based search only searches through the input space of the cyber software. As such, the test case generation method is unable to identify test cases that are unfeasible for the physical system.

Figures 2A, 2B:
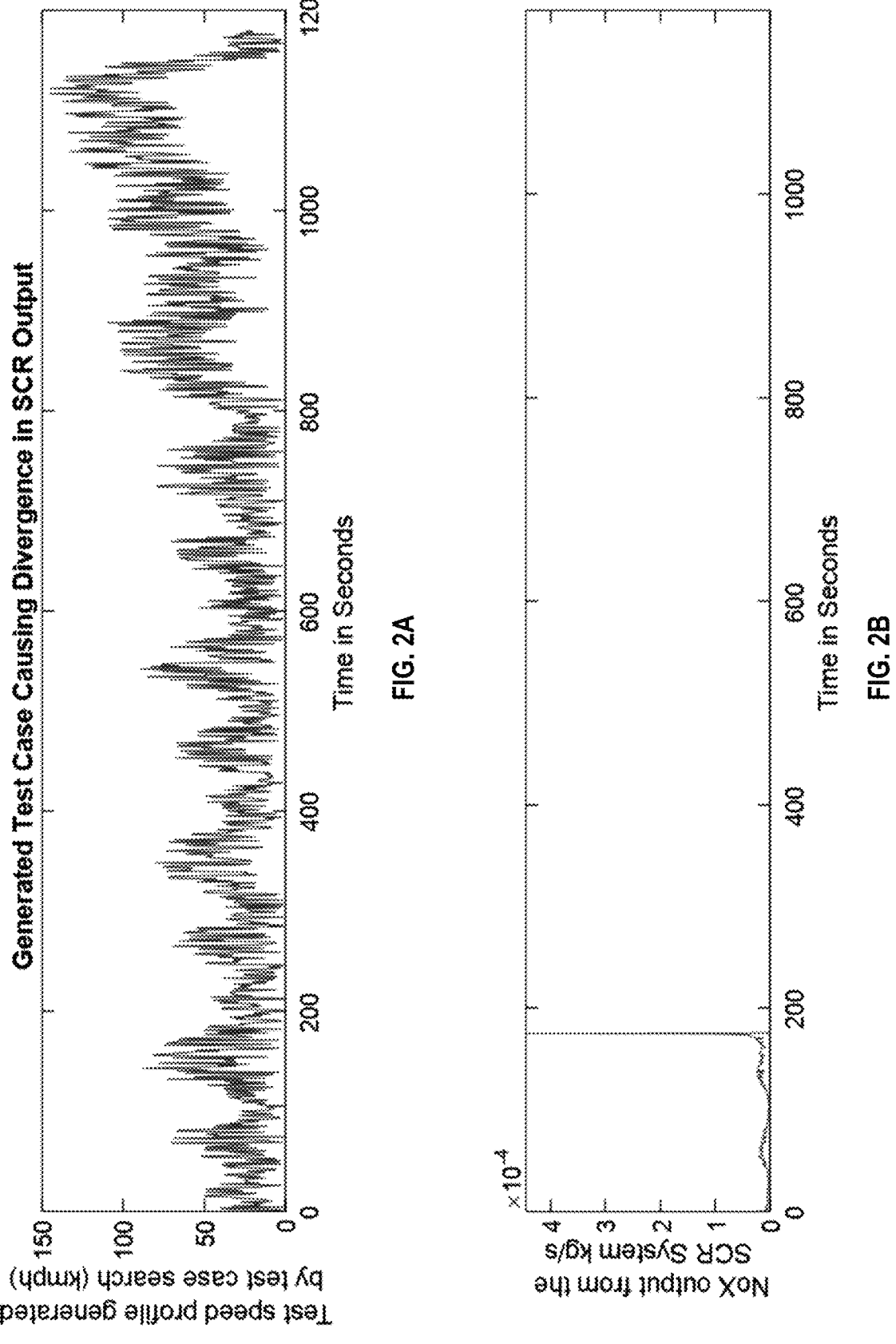
FIGS. 2A and 2B are a pair of graphical representations respectively showing inputs and outputs of a cyber-physical system case study (vehicle input speed and emissions) over time.

For example, in the emission control case study, the test case generation mechanism cannot identify a speed variation that is beyond the physical capabilities of the automobile. To demonstrate this, an SI engine ECU with a full system model of SCR and a combination of feedforward and feedback urea injection system were implemented in Simulink. The ECU was fitted with a cheating device modeled after a real-world cheating device infamously employed by a particular vehicle manufacturer and the doping test algorithm was used to generate a test case that triggered the cheating device. FIGS. 2A and 2B show the generated test case that exhibits fast variations in speed that are physically not attainable by the automobile. As such, when the test case was run on the Simulink model, it led to a divergent solution as shown in FIG. 2B.

The present disclosure outlines a framework (also referred to herein as "CyPhyTest") that applies a novel methodology that makes input test case generation aware of the dynamical cyber-physical interactions in a CPS. Practical challenges with a dynamical system include: a) Zeno behavior in zero crossing events, and b) divergence in solution based on initial conditions. The step size for solving dynamical systems has to be reduced to accurately estimate zero crossing events which are essential for the stability of the solution. For certain input test cases generated by the test search mechanism, the time step can be very small resulting in long simulation delays. This can make test case generation unfeasible. Moreover, for certain input combinations, the solution to the dynamical system may diverge. Divergence for a given initial condition may be mistaken for the failure of the test case. However, this divergence is a property of the model and not a characteristic of the CPS. To tackle the above-mentioned problems, the framework enhances the existing doping test mechanism by integrating a tempo-refining mechanism, which: a) avoids Zeno behavior near zero crossing events for a given initial condition, and b) avoids divergence in the solution and provides feedback to the input test case generation.

2. General System

Figure 3A:
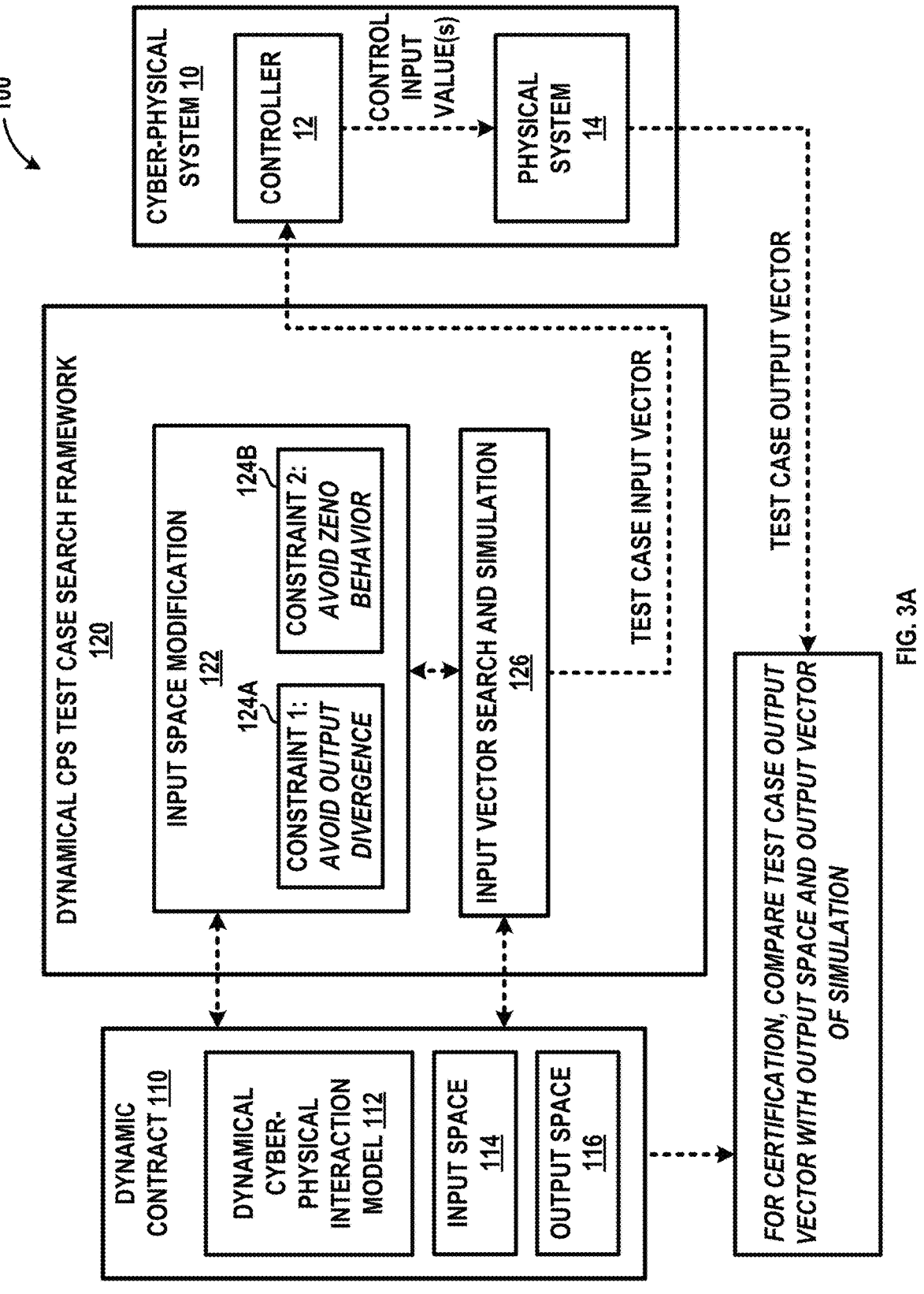
FIGS. 3A and 3B are a pair of block diagrams showing a computer-implemented CPS certification system for certification of a cyber-physical system including a dynamical CPS test case search framework.
Figure 3B:
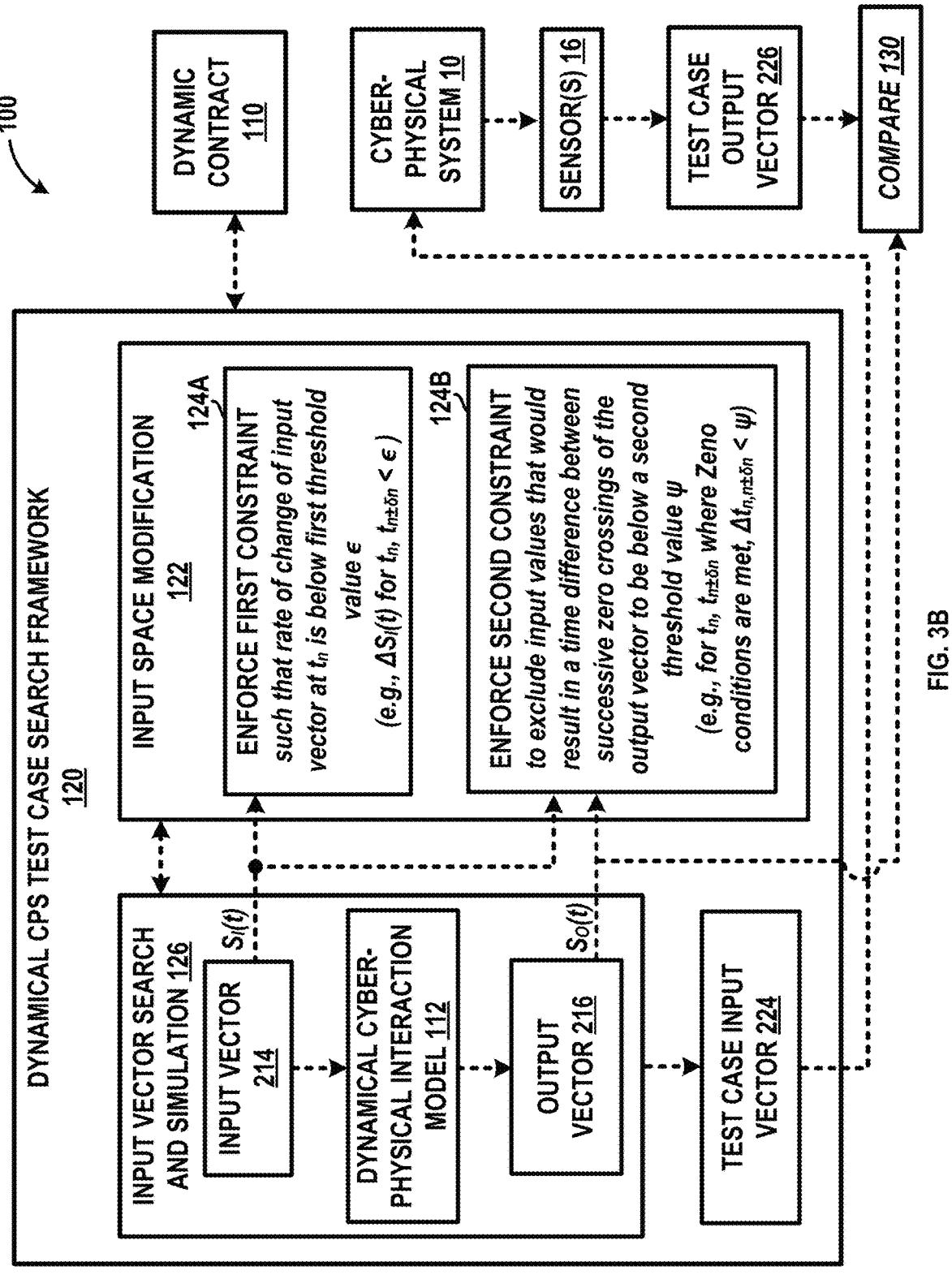

FIGS. 3A and 3B show a computer-implemented dynamic certification system (hereinafter, certification system 100) for certification of a cyber-physical system 10. The cyber-physical system 10 can include a controller 12 that receives inputs in the form of an input vector (e.g., a test case input vector) and applies control input(s) to a physical system 14 of the cyber-physical system 10. The physical system 14 can include electromechanical components that actuate in response to the control input(s) from the controller 12. An output vector can include output value(s) associated with the physical system 14, which can be measured or otherwise reported by the cyber-physical system 10 or another device of the certification system 100 that can include one or more sensor(s). The certification system 100 can include dynamical CPS test case search framework (hereinafter, framework 120) that can be implemented at a computing device (e.g., computing device 400 shown in FIG. 12) for generating the test case input vector for certification of the cyber-physical system 10.

2A. Dynamic Contract

The certification system 100 can receive and maintain contract information of a dynamic contract 110 that includes model information of a dynamical cyber-physical interaction model 112 that characterizes the cyber-physical system 10. The model information can include a set of state variables S(t) and information about system dynamics of the dynamical cyber-physical interaction model 112. The dynamic contact 110 can also include an input space 114 that defines inputs that are eligible for construction of the input vector for certification of the cyber-physical system 10, as well as an output space 116 that defines outputs that are acceptable for certification. The framework 120 can simulate (e.g., at an input vector search and simulation block 126 of the framework 120) the dynamical cyber-physical interaction model 112 for a plurality of time steps. Importantly, the framework 120 can continuously modify (e.g., at an input space modification block 122 of the framework 120) the dynamic contract 110 at each time step, and imposes additional constraints on the input space 114 and the output space 116 of the dynamic contract 110. These constraints include a first constraint on a rate of change of the input vector and a second constraint on the input vector to avoid Zeno behavior of the corresponding output. The first constraint and second constraint collectively ensure that test cases generated by the certification system 100 can trigger outputs that can indicate cheating or model mischaracterization on the side of the manufacturer while still being feasible for the physical limitations of the cyber-physical system 10.

2B. Input Vector

An input vector 214 can include inputs to the dynamical cyber-physical interaction model 112 for an $n^{th}$ time step. In some examples, the input space 114 of the dynamic contract 110 defines an acceptable set of input values that can be selected to construct a test case input vector 224 for the $n^{th}$ time step. The framework 120 can receive or otherwise identify the input vector 214 as part of a search process to construct the test case input vector 224. In some examples, the input vector search and simulation block 126 receives, generates, or otherwise initializes the input vector 214 for application as input to the dynamical cyber-physical interaction model 112. If the input vector 214 satisfies the input space 114, then the input vector 214 can be included within the test case input vector 224 during certification of the cyber-physical system 10.

For the vehicle emissions example outlined herein, the dynamic contract 110 can constrain the input space 114 for the $n^{th}$ time step to a range of acceptable vehicle speed values (e.g., at the $n^{th}$ time step, the vehicle speed can be between 10 and 40 mph).

2C. Output Vector

Likewise, an output vector 216 can be an output of the dynamical cyber-physical interaction model 112 for the $n^{th}$ time step that corresponds with the input vector 214. In some examples, the output space 116 defines an acceptable set of output values for the $n^{th}$ time step that can be expected from the dynamical cyber-physical interaction model 112 follow-ing application of the input vector 214 to the dynamical cyber-physical interaction model 112 for the $n^{th}$ time step. In some examples, the input vector search and simulation block 126 receives or otherwise determines the output vector 216 as an output of the dynamical cyber-physical interaction model 112. The output vector 216 can be used to identify if the input vector 214 can be included within the test case input vector 224 during certification of the cyber-physical system 10.

For the vehicle emissions example outlined herein, the dynamic contract 110 can define the output space 116 for the $n^{th}$ time step to a range of acceptable emissions values (e.g., at the $n^{th}$ time step and for a given vehicle speed specified within the input vector for the $n^{th}$ time step, quantified emissions can be within a specific range).

2D. Framework for Test Case Search, Contract Modifi-cation, and Contract Enforcement The framework 120 can iteratively suggest and evaluate input vectors 214 to construct the test case input vector 224 for application to the cyber-physical system 10 during certification. The framework 120 evaluates input vectors 214 based on the input space 114 of the dynamic contract 110, and also modifies the input space 114 of the dynamic contract 110 to ensure that the test case input vector 224 selected for the certification process avoids output diver-gence and Zeno behavior.

For an $n^{th}$ time step $t_n$, the framework 120 enforcing the dynamic contract 110 constrains the input vector 214 based on the input space 114 provided within the dynamic contract 110. The framework 120 (e.g., input space modification block 122 formulated at the processor) dynamically modifies the input space 114 of the dynamic contract 110 for the $n^{th}$ time step based on the set of state variables S(t) of the dynamical cyber-physical interaction model 112 to further constrain the input vector 214, e.g., to preclude selection of input values that could enable a manufacturer to "cheat" during the certification process. In some examples, this process involves constructing the input vector 214, simulat-ing the dynamical cyber-physical interaction model 112 using the input vector 214 to obtain the output vector 216, and selecting input values of a test case input vector 224 for application to the cyber-physical system at certification. This process may be repeated as needed until one or more optimal test case input vectors 224 are identified.

The processor that enforces the dynamic contract 110 and generates test cases for certification can search the input space 114 for the input values of the test case input vector 224 following modification of the input space 114 of the dynamic contract 110. The test case input vector 224 should satisfy the input space 114 of the dynamic contract 110 in terms of the dynamical cyber-physical interaction model 112; this can be determined by application of a labeled transition system satisfiability algorithm and/or another suit-able method to the input values of the test case input vector 224 of the input test case. Selection of input values of the test case input vector 224 can include selecting input values that satisfy the input space 114 of the dynamic contract 110 while violating the output space 116 of the dynamic contract 110 (e.g., to select input values that, when applied, result in observable cheating conditions or that otherwise show mis-characterization of the dynamical cyber-physical interaction model). Input vectors 214 can be rejected as test case input vector(s) 224 if they violate the input space 114 of the contract as originally defined and/or if they violate the input space 114 of the dynamic contract 110 following modifica-tion as outlined herein.

2D.1 First Constraint

In particular, the framework 120 (e.g., first constraint block 124A of the input space modification block 122) modifies the input space 114 of the dynamic contract 110 for the $n^{th}$ time step to constrain the input vector 214 based on the rate of change of the input vector 214 (e.g., to avoid selecting input values that would cause a rate of change of the input vector 214 to exceed a first threshold value). For the time step $t_n$, and for another time step $t_{n \pm \delta n}$, the frame-work 120 constrains a difference between input values of the input vector 214 for $t_{n \pm \delta n}$ to be below a first threshold value $\epsilon$, which can vary depending on the properties of the dynamical cyber-physical interaction model 112 and depending on the physical limitations of the cyber-physical system 10. Section 4A outlined below defines the first constraint and how it relates to system dynamics.

For the vehicle emissions example outlined herein, the (unmodified) dynamic contract 110 can constrain the input space 114 for the $n^{th}$ time step to a range of acceptable vehicle speed values (e.g., at the $n^{th}$ time step, the vehicle speed can be between 10 and 40 mph). However, if the vehicle speed was 11 mph at an $(n-\delta n)^{th}$ time step where $\delta n$ is a very short amount of time (e.g., $\delta n=1$ second), it can be infeasible for the vehicle speed at the $n^{th}$ time step to be 39 mph even though both values are allowable in terms of the input space 114 initially defined within the dynamic contract 110. As such, the first constraint on the input space 114 as enforced by first constraint block 124A of the framework 120 constrains the rate of change (e.g., acceleration) of the input vector 214 (e.g., speed) such that the input value(s) at the $n^{th}$ time step are feasible in view of the input value(s) at the $(n \pm 8n)^{th}$ time step. The first constraint can limit the rate of change of the input vector 214 to be below the first threshold value $\epsilon$, which can vary depending on the capa-bilities of the vehicle.

2D.2 Second Constraint

In addition, the framework 120 (e.g., second constraint block 124B of the input space modification block 122) modifies the input space 114 of the dynamic contract 110 for the $n^{th}$ time step to constrain the input vector 214 to avoid Zeno conditions (e.g., to avoid selecting input values that would cause the output of the dynamical cyber-physical interaction model 112 to exhibit Zeno behavior). Generally, the framework 120 simulates the dynamical cyber-physical interaction model 112 for input values of the input vector 214 to obtain the output values of the output vector 216 that corresponds with the input vector 214. If the output values indicate Zeno behavior, then the framework 120 modifies the input space 114 of the contract to exclude the input values of the input vector 214 that result in Zeno behavior. The framework 120 constrains a time difference between successive zero crossings of the output vector 216 to be above a second threshold value $\psi$ associated with a simu-lation time step lower limit, which can be defined in terms of interactions between the set of state variables S(t) of the dynamical cyber-physical interaction model 112 and the input vector 214. The second threshold value may vary depending on the properties of the dynamical cyber-physical interaction model 112 and depending on the physical limitations of the cyber-physical system 10. Section 4B outlined below defines the second constraint and Zeno conditions in greater detail.

For the vehicle emissions example outlined herein, the dynamic contract 110 can outline a range of output values of the output space 116 for the $n^{th}$ time step that can include a range of acceptable vehicle emissions values. However, there can be scenarios where the values of the input vector 214 (e.g., speed over time) cause the vehicle emissions values indicated within the output vector 216 to meet Zeno conditions for the $n^{th}$ time step and for an $(n-\delta n)^{th}$ time step, where $\delta n$ is a short amount of time (e.g., $\delta n=1$ second) and can be associated with a simulation time step lower limit. This can cause conflicting behavior in the control dynamics of the vehicle even though the emissions of the vehicle may be within the allowable range indicated by the output space 116. As such, the second constraint on the input space 114 as enforced by second constraint block 124B of the framework 120 constrains the input vector 214 such that the output vector 216 does not exhibit Zeno behavior. The second constraint can limit a time difference $\Delta t_{n,n \pm \delta n}$ between two successive zero crossings of the output vector 216 of the dynamical cyber-physical interaction model 112 to be above the second threshold value $\psi$. The allowable time difference can be defined in terms of interactions between the set of state variables S(t) of the dynamical cyber-physical interaction model 112 (e.g., depending on characterization of the dynamical cyber-physical interaction model and the capabilities of the vehicle) and the input vector 214.

As such, the input vector 214 may be rejected or otherwise excluded from the test case input vector 224 if the rate of change of the input vector 214 is above the first threshold value and/or if the time difference between two successive zero crossings of the output vector 216 that results from application of the input vector 214 to the dynamical cyber-physical interaction model 112 is below the second threshold value.

It is important to note that while the second constraint is intended to limit certain conditions of the output vector 216 (i.e., Zeno conditions), the second constraint is directed at constraining the input space 114 to avoid these conditions in terms of the dynamical cyber-physical interaction model 112 (e.g., rather than constraining the output space 116). During construction of a test case input vector 224 for application to the cyber-physical system for certification, the test case input vector 224 may be selected based on its potential to satisfy the input space 114 while violating the output space 116.

If a test case input vector 224 that simultaneously satisfies the input space 114 while violating the output space 116 is applied to the cyber-physical system 10 during certification, cheating conditions and/or mischaracterizations of the dynamical cyber-physical interaction model 112 of the cyber-physical system 10 can be identified based on discrepancies between the expected outputs the actual outputs. In some examples, the certification system 100 can include a "compare" block 130 that examines the actual outputs with respect to the expected outputs. Expected outputs can be included within output vector 216 as obtained through application of the input vector 214 to the dynamical cyber-physical interaction model 112, where the input vector 214 corresponds to the test case input vector 224. Actual outputs can be included within the test case output vector 226 as measured by one or more sensors 16 at the output of the cyber-physical system 10 when test case input vector 224.

The following section outlines development of the dynamic contract 110 and framework 120 of the certification system 100 with respect to a vehicle emissions case study and provides further reasoning and definitions with respect to the first constraint and the second constraint discussed herein.

3. Preliminaries and System Model

Software doping first came into light during a scandal where a vehicle manufacturer was found to have cheated during emissions testing for new models. Software doping includes intentionally adding a piece of software that alters the operation of the CPS to bypass testing standards. The concept of system doping is as an intervention with the operation of the system causing deviation of the system's normal behavior. Some examples of system doping are vendors checking and refusing third-party spare parts or cartridges in the case of printers.

3A. System Model

Figure 4:
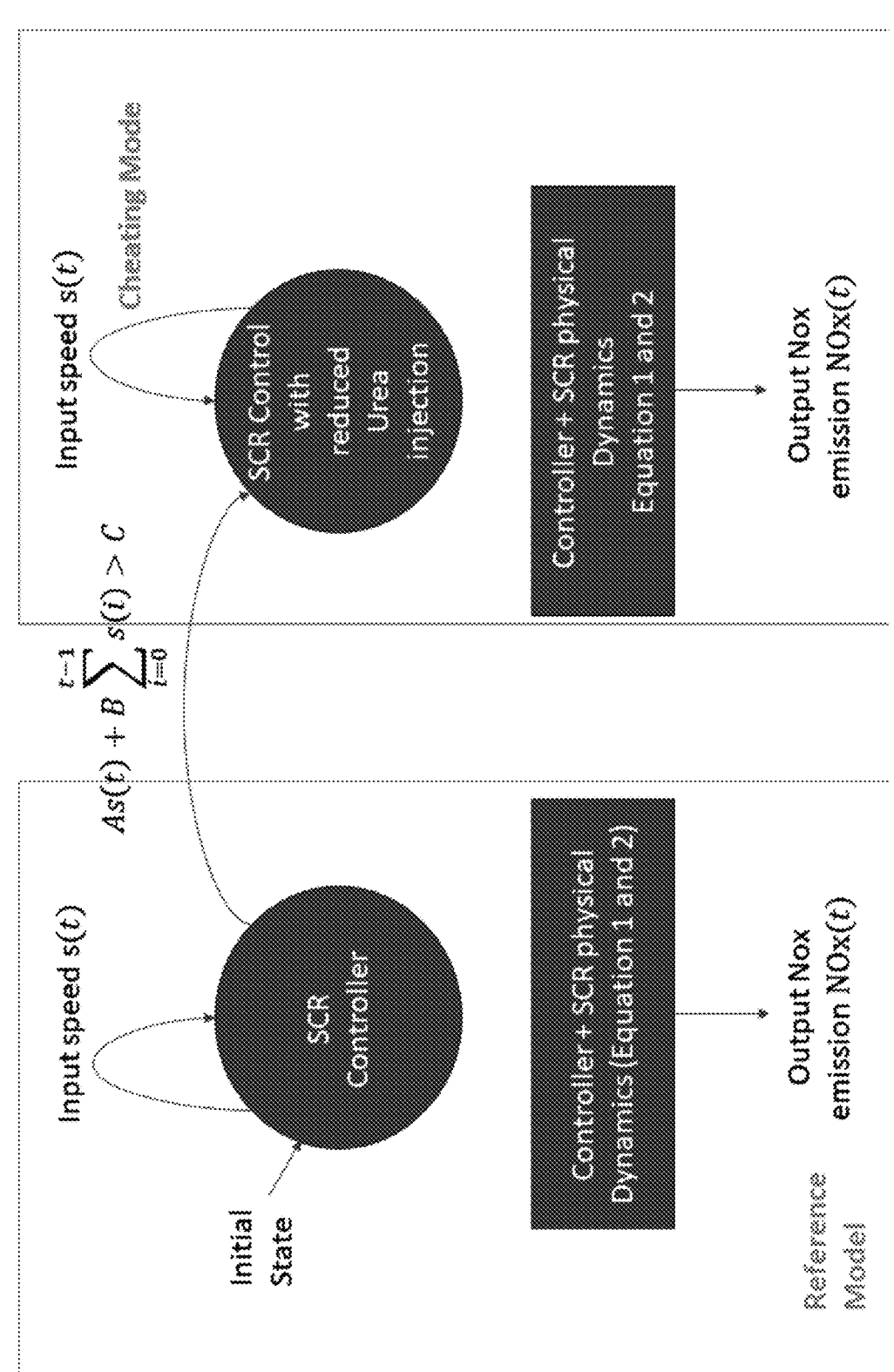
FIG. 4 is a diagram showing an input labelled transition system for a vehicle emissions case study described herein with a cheating device that causes the outputs of the vehicle to diverge from outputs of a reference model.

Test case generation mechanisms such as doping test, assumes input labeled transition system (ILTS) model of the CPS. In this model, the CPS is represented as a collection of states. Transition from one state to the other is dependent on the input received from the external sources. For each input, the state may or may not generate an output. The output is generated by a dynamical system that expresses the effect of actions taken in the particular state. In case of a CPS, the dynamical system is modeled as a set of non-linear differential equations. The combination of states, transitions labeled by inputs, and state dynamics is an ILTS model. FIG. 4 shows an example ILTS representation of the emission control system in automobiles with a cheating device (Discussed in detail in Sections 3H-3F).

3B. Doping Test

The Doping Test (DT) is an example model-based input-output conformance testing algorithm. The DT mechanism proposes a modification to existing certification methods by requiring the manufacturer and certifier to agree on a contract, which includes three components:

input distance: The existing certification mechanism requires a standard test cycle that is publicly available. The DT mechanism can generate test inputs within an envelope of the test cycle defined by the input distance. In case of the emission control system this manifests as a range of variance on the input vehicle speed.

output distance: This is the allowable amount by which the output of the system can deviate from the output of the system under the standard test cycle. In the emission control case, this is an upper limit on the NOx output of the SCR.

reference model: This a ILTS specification of the tended operation of the CPS. The ILTS of an automobile is shown in FIG. 4.

Given a contract, the DT mechanism searches through the input space of the cyber component to determine an input test case that satisfies the input distance constraint but violates the output distance constraint. There are many different ways to search the input space including random and optimized search. As such, the input search algorithm is independent of the cyber-physical interaction model of the ILTS states. It only searches through the input labeled transitions.

3C. New European Driving Cycle

Regulatory agencies check emission compliance of a vehicle on the Engine Control Unit (ECU). The checks include a predefined test cycle of speed against time that imitates actual driving conditions. The New European Driving Cycle (NEDC) is one such test that includes urban and extra-urban driving conditions and covers a total distance of 11023 meters and lasts for 1180 seconds. The NEDC testing cycle follows a specific sequence of speed braking and gear changes. NEDC tries to imitate normal driving conditions to detect emission compliance. The speed profile of this test and other testing conditions are publicly available and presents manufacturers with the opportunity to find different techniques to circumvent the emission requirements. The input set for the NEDC test cycle is the speed profile and a set of sensory inputs. The output set includes the exhaust gasses or particulate matter coming out of the vehicle. The tests like NEDC involve the measurement of the $NO_x$ per kilometer since the beginning of the test to check compliance with emission standards.

3D. Urea Injection Controller

The rate of flow of urea mainly depends on the measured values of $NO_x$ in the output of the SCR. The controller includes a feedforward controller (FF(t)) that uses a predictive model of the SCR and a feedback controller (FB(t)) that acts as the error-correcting unit, as shown in (Eqn 1).

$$\begin{cases} FF(t) = \dfrac{1}{E_{des}} n^*_{NO_x} & (1) \\[2mm] FB(t) = K_p e_{NO_x} + K1 \displaystyle\int_t^0 e_{NO_x} dt + 1 \\[2mm] e_{NO_x} = N(t) - O(t) \\[2mm] UD(t) = FB(t) * FF(t) \end{cases}$$

N(t) is the desired $NO_x$ concentration setpoint at the output, O(t) is the $NO_x$ output of the SCR system, and UD(t) is the amount of delivered urea. The input set of the controller is $e_{NO_x}$. The feedforward controller derives a static flow of urea into the SCR. Here $E_{des}$ is the constant $NO_x$ to $NH_3$ emission ratio. The feedback controller calculates the error between the desired value N(t) and the actual output value of $NO_x$, O(t). $K_p$ and $K_1$ are constants depending on the SCR model. The feedback controller is steady against noise and less reactive in real-world scenarios. Initially, the feedback controller output is filtered out. The output from the feedforward and the feedback controller are multiplied to tackle the nature of the error.

3E. SCR Catalytic Converter

The target of a catalytic converter is to reduce $NO_x$ from the exhaust gas. The dynamics of the SCR are chemical in nature and are represented using the following set of equations.

$$\begin{cases} \dfrac{d(T)}{dt} = a_7 m^*_{eg}(T_{in} - T) - a_9(T^4 - T^4_{amb}), & (2) \\[3mm] \dfrac{d(\Theta)}{dt} = \dfrac{(a_3(T)1 - \Theta C_{NH_3} - (a_4(T) + a_5(T)C_{NO_x} + a_6(T))\Theta)}{C_s} \\[3mm] C_{NH_3} = \dfrac{(a_2 Y(t) + a_4(T)\Theta)}{(a_1 a_2 m^*_{eg} T + a_3(T)(1 - \Theta))}, \\[3mm] C_{NO_x} = \dfrac{(a_2 n^*_{NO_x})}{(a_1 a_2 m^*_{eg} T + a_5(T)\Theta)} \end{cases}$$

The input set I(t) includes the molar mass flow of $$NO_x n^*_{NO_x},$$

the temperature of the exhaust gas $T_{in}$, and the mass of the exhaust gas $$m^*_{eg}.$$

The output set O(t) includes just the concentration of $NO_x$ in the exhaust gas after the SCR. The $\alpha_1$, $\alpha_2$, $\alpha_3$, $\alpha_4$, $\alpha_5$, $\alpha_6$, $\alpha_7$, $\alpha_8$ and $\alpha_9$ are calculated depending on the SCR model and the input temperature. C s is a constant depending on the gas volume of the converter.

3F. ILTS Example of Cheating Device

The cheating device includes a monitor and a doping agent. The monitor uses a piece-wise linear model of the speed vs. distance curve in a NEDC test cycle. It senses the speed and distance traversed by the automobile and checks whether the current state of the automobile is beyond a predefined window around the piece-wise linear model of the test cycle. When such a state occurs, the set point of the SCR controller is set to a high value so that the feedback controller drastically reduces the multiplicative factor on the feed forward controller, resulting in much less urea injection into the SCR catalytic converter and increases the exhaust tailpipe $NO_x$ emission.

In the ILTS model (FIG. 4) the input is the vehicle speed and the output is the $NO_x$ emission level at each step. The dynamical model in each state is represented using Equations 1-2. The state transition is solely dependent on the input. The cheating mode is triggered when the speed vs. distance curve goes beyond a piecewise linear approximation (black solid lines in FIG. 6). The condition can be expressed as a linear function of the input. In the cheating device the set point of the feedback controller is changed to favor reduced urea injection.

4. Integrating Dynamical Cyber-Physical Interactions in Test Case Search

As discussed above with reference to FIGS. 3A and 3B, the framework (e.g., framework 120) introduces two additional constraints on the input variations used in the test case search algorithm. The first constraint is derived by limiting the smallest time difference between two zero crossings of the cyber-physical interaction model (to avoid Zeno behavior). The second constraint is derived by limiting the rate of change of state parameters of the cyber-physical interaction model (to avoid divergence). The constraints are derived by assuming a linear state space model of the cyber-physical interaction.

4A. Deriving Input Constraints to Avoid Model Divergence

This section corresponds with Section 2D.1 outlined above with reference to framework 120.

Let S(t) represent the state variables of the dynamical system representing the cyber-physical interactions, then the system dynamics can be represented by Equation 3.

$$S'(t) = AS(t) + B. \quad (3)$$

The state variables S(t) is a vector that includes inputs, outputs and hidden variables. Let the set of variables denoted as input be $S_I(t)$. A and B are the parameters of the interaction model that are constants of the dynamical system.

For a simulation time step of $\delta t$, the framework (e.g., first constraint block 124A of framework 120 shown in FIGS. 3A and 3B) ensures that $\max_j S_j(t+\delta t) < \epsilon$, where epsilon is a upper threshold on a variable in the state space representation and $S_j(t)$ is the temporal evolution of the $j^{th}$ variable in the state space vector. The framework aims to limit the derivative of the input variables $S_f(t)$ such that the E change constraint on the state variables is satisfied (Equation 4).

$$\text{find } S_f(t) \text{ such that} \tag{4}$$

$$\max_i \{S(t) + (AS(t) + B)\delta t\} < \epsilon$$

1) Finding the input space for SCR system: For the SCR system, Equation 2 can be linearized. The linearization can be performed using residual analysis, Taylor series expansion of the residue and ignoring higher order terms of the residue. The derivation steps are not shown in the manuscript due to space constraints. The problem definition in Equation 4, resolves to the following equation for determining the allowable variation of speed while searching for a test case that triggers the cheating device in the SCR controller.

$$\frac{1}{a_0 m_{EG}^*} \frac{n_{NO_x}^*\left(T_{in} + \frac{b}{a}\left(e^{a\delta t} - 1\right)\right) - n_{NO_x}^* b e^{a\delta t}}{T_{in}^2 + 2T_{in} b e^{at}} < \epsilon, \tag{5}$$

where $$\alpha = -\left(\alpha_7 m_{EG}^* + 4\alpha_9 T_{in}^3\right) \tag{30}$$

and $$b = -\alpha_9\left(T_{in}^4 - T_{amb}^4\right)$$

are constants.

Once an initial standard trace for the NEDC test cycle is selected the $$n_{NO_x}^*$$

is fixed as the input. The Equation 5 gives an upper limit to the differential of $$n_{NO_x}^*$$

that is allowable without causing divergence in the dynamical model of the cyber-physical interaction. The test case search is restricted by this constraint.

4B. Avoidance of Zeno Behavior

This section corresponds with Section 2D.2 outlined above with reference to framework 120.

Zeno behavior occurs when there are two conflicting control decisions take effect within a very small time interval. For example, if the input speed to the automobile alternates between a high and low level, then the $NO_x$ emitted from the engine will also alternate across the set point resulting in conflicting control decision in the feed forward part of the controller. These fast variations in input speed can lead to zeno behavior in the system of equations representing the dynamics. In the modification to the test case search algorithm outlined herein, the framework (e.g., second constraint block 124B of framework 120 shown in FIGS. 3A and 3B) estimates the potential of a test case to cause a zeno effect in the system dynamics and reject such test cases even if it satisfies the contract and the constraints in Equation 5.

Zero crossing is detected at time when $S(t)>\phi$ and $S(t)<0$ while $S(t+\delta t)<-\phi$ and $S(t)>0$ at the next simulation time step $\delta t$. Zero crossing may lead to zeno behavior if $\delta t \approx 0$. To detect the potential of zeno behavior, the framework derives the time difference between two successive zero crossings of an output vector (corresponding with an input vector) and puts a lower limit on the simulation time step ($\psi$). This results in the condition in Equation 6.

$$\frac{2\phi}{\max_i AS(t) + B} < \psi. \tag{6}$$

If the condition in Equation 6 is satisfied for a given input set $S_f(t)$, then the input test case is rejected and is regenerated.

1) Zeno behavior in SCR: In an SCR system linearization of the Equation 1-2 leads to the special case of Equation 6 in Equation 7.

$$\frac{a_2}{a_1 a_2 m_{EG}^*} \frac{\left(n_{NO_x}^*\left(T_{in} + \frac{b}{a}(e^{at} - 1)\right) - n_{NO_x}^* b e^{at}\right)}{T_{in}^2 + 2T_{in} b e^{at}} \psi < 2\phi \tag{7}$$

If the input speed variation results in a $NO_x$ differential that satisfies Equation 7 then the input test case is rejected. $\phi$ and $\psi$ are design choices.

Conversion of $NO_x$ variation to vehicle speed: The relation between $$n_{NO_x}^*$$

and vehicle speed is a function of the wheel and gear assembly and the SI Engine dynamics. To derive the relationship, the speed s can be converted to engine rpm R using the approximate parameters of the wheel and gear assembly of one particular real-world vehicle model (Equation 8).

$$R = 300 + \frac{S}{3.6 \times 0.2 \times 0.1047} \tag{8}$$

The relation between engine rpm R and the $NO_x$ output of the engine (input to the SCR) is obtained by first running a benchmark load on the ECU and then fitting a nonlinear model to the data (Equation 9).

$$n_{NO_x}^* = -0.0109 + 0.0073 R^{0.0751}. \tag{9}$$

5. Implementation and Evaluation

Figure 5:
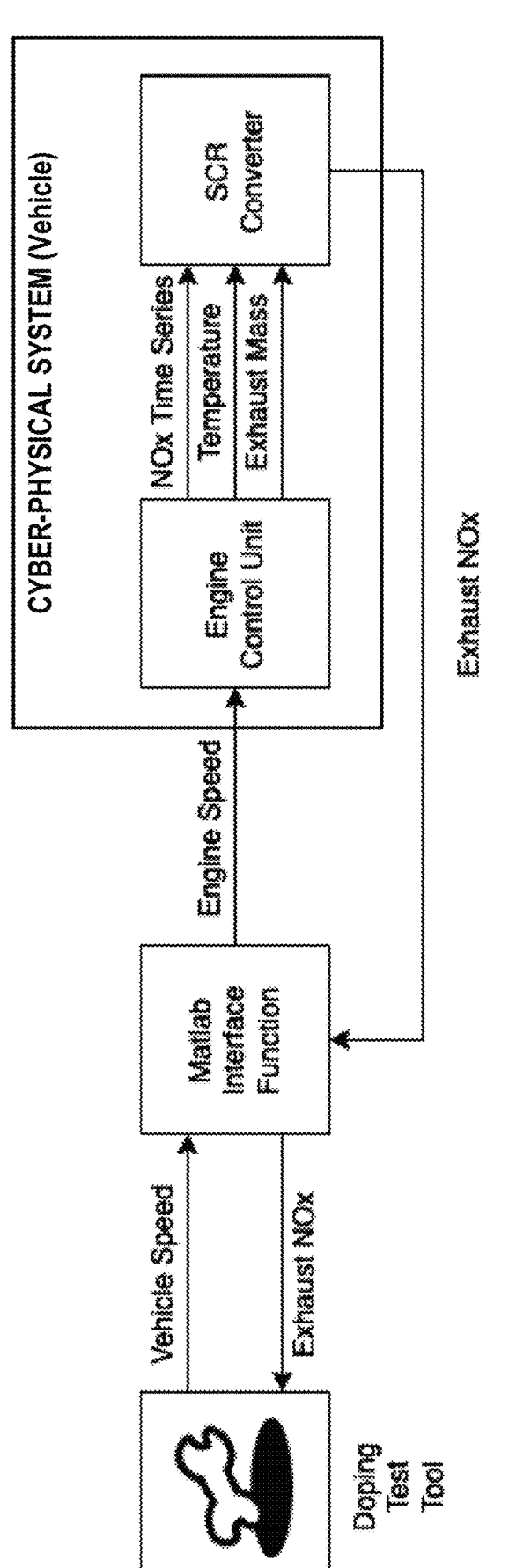
FIG. 5 is a diagram showing one implementation of a doping test tool setup for comparison with the system of FIGS. 3A and 3B applied to a vehicle emissions case study.

In one example, the SCR catalytic converter can be implemented in Simulink and connected with the doping test generation tool using a Matlab interface. The doping test generation tool comes up with a test case that satisfies the contract. The Matlab interface receives this generated test trace and feeds it to the SCR simulator. The Matlab interface acts as a hub for communication between the Simulink model and the doping test generation tool. The Simulink model then simulates the whole testing trace to calculate the total $NO_x$ output. The simulated $NO_x$ output is then sent back to the DT algorithm via the Matlab interface for further processing. The entire implemented system architecture is shown in FIG. 5.

The engine model considered in this exercise is the SI core engine. The Simulink implementation is utilized to generate the dataset. The selective catalytic reduction system was implemented in Simulink. The controller discussed in Section 3D is also implemented in Simulink.

5A. Baseline Performance for NEDC Test Cycle

Figure 6:
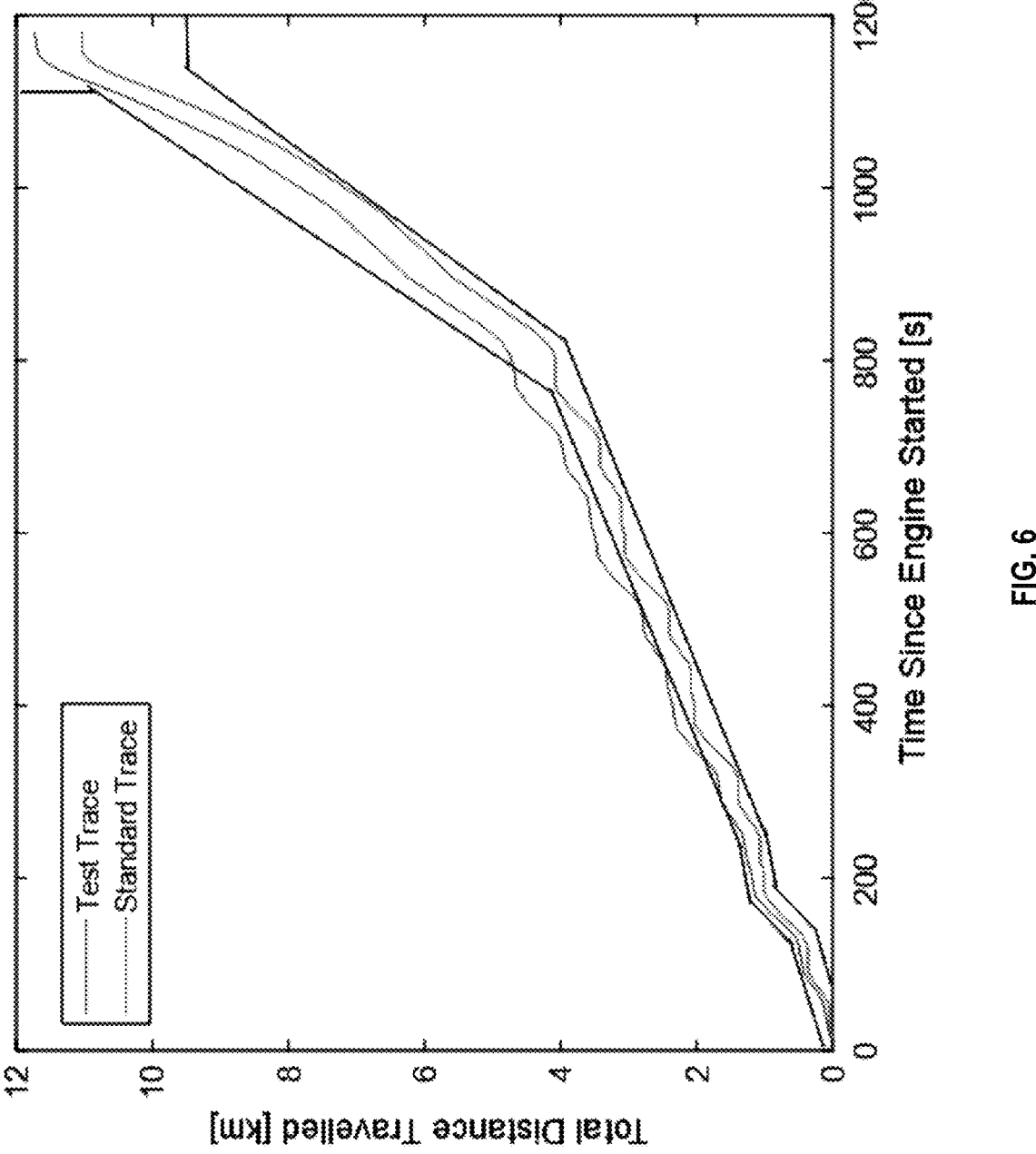
FIG. 6 is a graphical representation showing test traces and standard traces of a New European Driving Cycle test cycle for vehicle emissions testing.

The NEDC test cycle imparts a specific load on the engine described by a speed distance graph shown by the red solid line in FIG. 6.

Figures 7A, 7B:
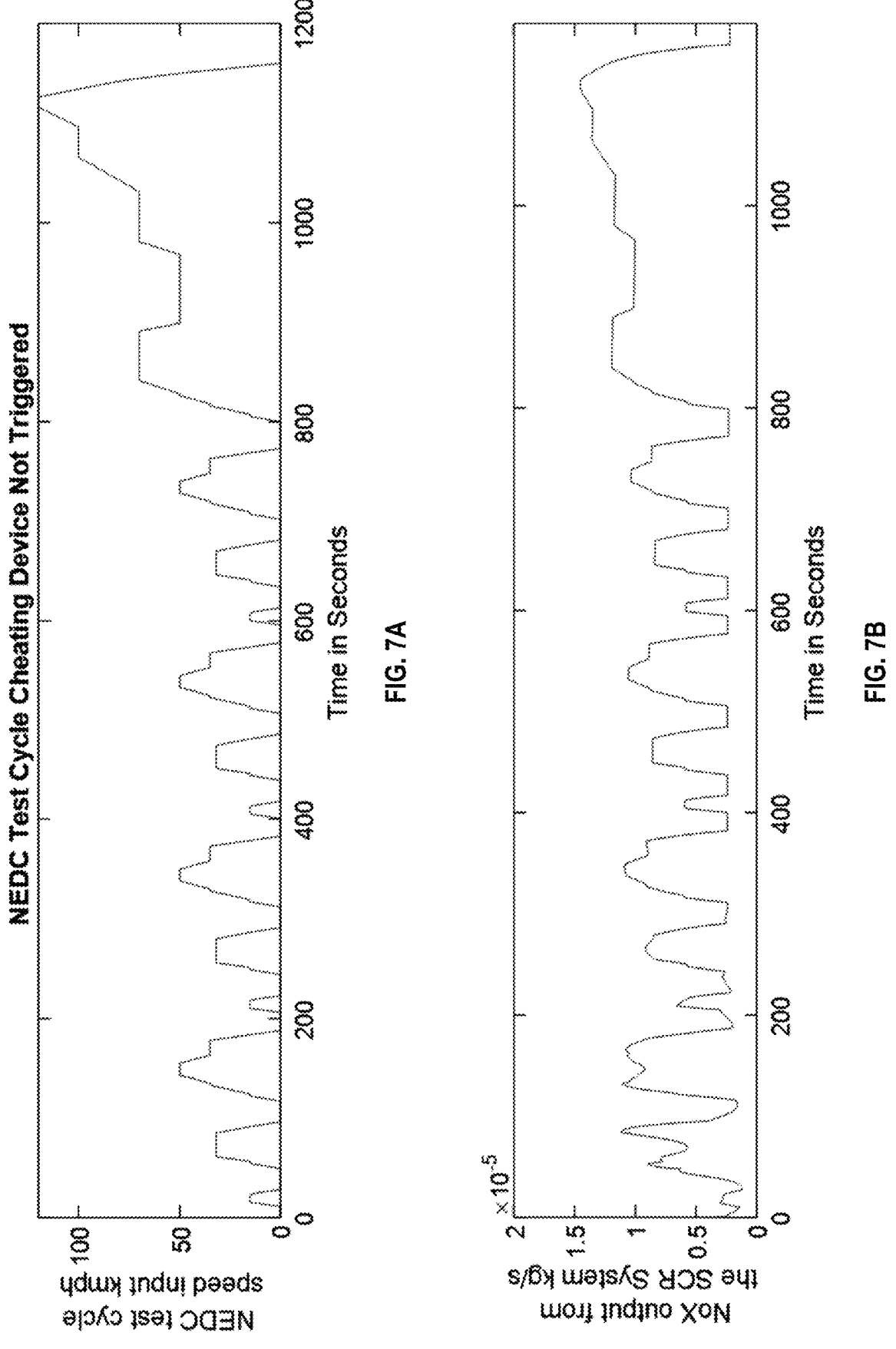
FIGS. 7A and 7B are a pair of graphical representations respectively showing baseline inputs and outputs of a cyber-physical system for the test cycle of FIG. 6 when a cheating device is not triggered.

This effectively results in an Engine Torque vs. Speed profile. The Engine model was first simulated in Simulink for the two cases to generate the $NO_x$ profiles for the NEDC test cycle and the normal on road operation. The exhaust concentration from the engine is provided as input to the SCR as Input $NO_x$ SCR. This Input NOX SCR is also fed as input to the controller. The controller then uses a nonlinear state space model to predict the output $NO_x$ concentration of the SCR. The simulation of the controller outlined in Section 3D for the NEDC test cycle resulted in the controller output (Output NH3 of Controller) as shown in FIGS. 7A and 7B. The entire simulation for the NEDC test cycle is run for 1180 seconds. The setpoint for the NEDC test cycle was set to $8 \times 10^{-6}$ kg/m$^3$.

5B. Comparison of Doping Test and CyPhyTest

Figures 8A, 8B:
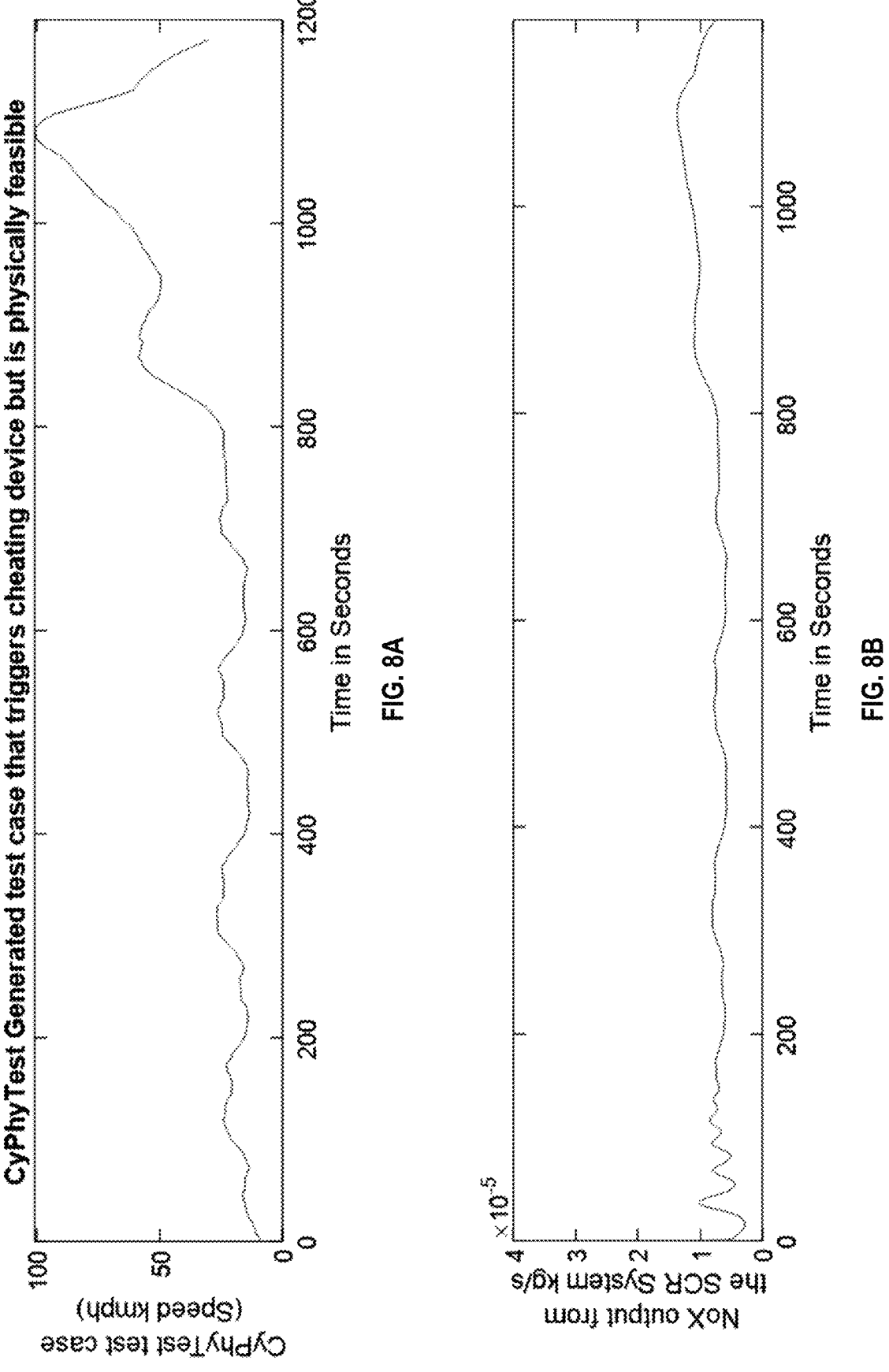
FIGS. 8A and 8B are a pair of graphical representations respectively showing inputs and outputs of a cyber-physical system for a test case generated by the system of FIGS. 3A and 3B that is physically feasible for the cyber-physical system and triggers a cheating device.
Figure 9:
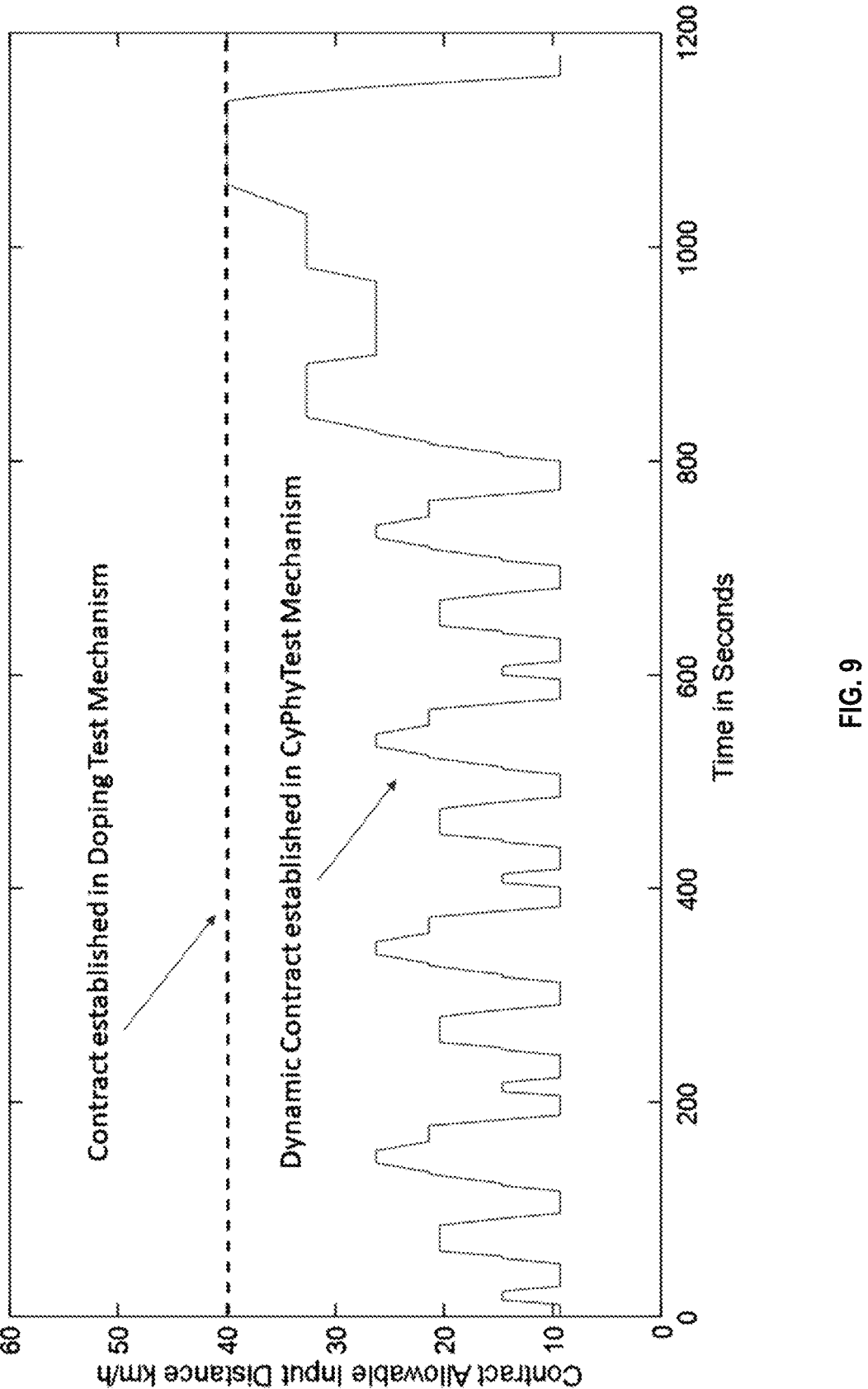
FIG. 9 is a graphical representation showing comparison between an input space of the dynamic contract of the system of FIGS. 3A and 3B compared with a fixed input space of a fixed contract enforced by a state-of-the-art doping test mechanism.

The cheating device changes the setpoint was set to $2 \times 10^{-5}$ kg/m$^3$. This high set point will cause the feedback gain of the controller to reduce drastically and consequently much lesser urea will be used. The input variation in the contract for the doping test was set to 40 kmph while the output variation was set at 180 kg/km of $NO_x$ emission. The framework outlined herein (CyPhyTest) dynamically modifies the contract at every input according to the constraints of the dynamical model of the cyber-physical interaction. In each input the dynamic contract is a more restrictive contract than the agreed upon fixed contract. The framework then generates a test case that triggers the cheating device as shown in FIG. 6 by the upper solid curve. The $NO_x$ output of the SCR system did not diverge and avoided Zeno behavior as shown in FIGS. 8A and 8B. The total $NO_x$ output is 431.4 kg/km much higher than the actual NEDC test cycle (193.4 kg/km). The difference in the input distance part of the contract is shown in FIG. 9.

Figures 10A, 10B:
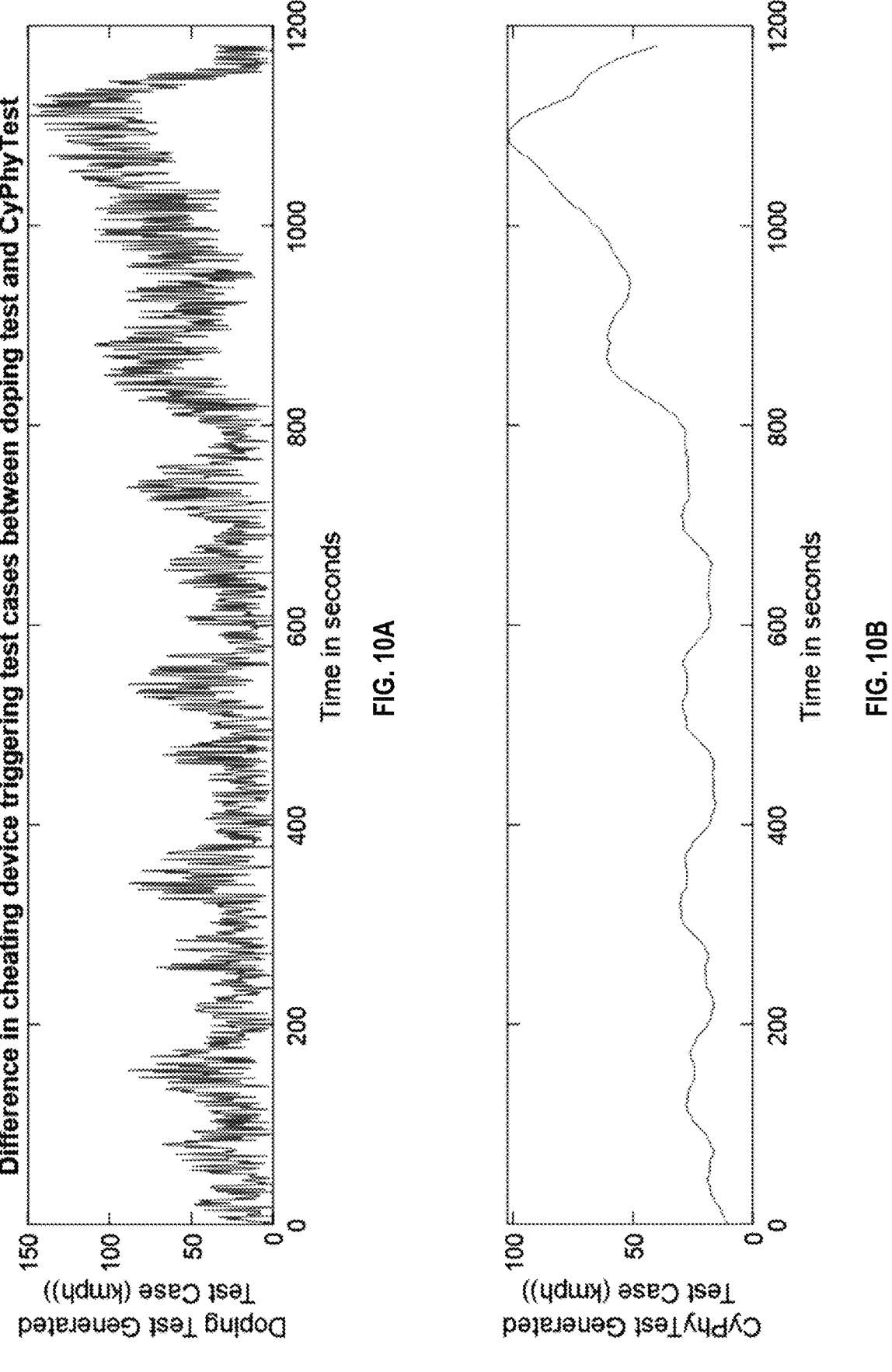
FIGS. 10A and 10B are a pair of graphical representations respectively showing comparison between an input vector of a test case generated by the state-of-the-art doping test mechanism and an input vector of a test case generated by the system of FIGS. 3A and 3B.

FIGS. 10A and 10B also compare the test cases generated by DT mechanism and the framework outlined herein (CyPhyTest). The DT mechanism operates using a randomized selection method, and hence generates a test case with significant variance. The framework outlined herein, on the other hand models the physical limitations of the components of the high resolution interaction model and limits the variation. As a result, while the DT test case causes divergence in the model, the test case generated by the framework can actually be executed in an actual automobile and trigger the cheating device.

The doping test mechanism is a recent initiative to evaluate potential operational changes in a CPS after it is deployed and operates beyond testing regimens. The initial work only utilized random search for a test case while satisfying a contract but only considered the software characteristics of the CPS and ignored the cyber physical interactions. The test cases were often not physically executable. The framework outlined herein (CyPhyTest) makes test case generation mechanisms such as doping test aware of the cyber physical interactions in a CPS and allows for generation of test cases that can be executed in a practical deployment. The framework does that by continually updating the contract within the premise of the original contract such that the test case meets the constraints of the dynamical model representing the interaction. Usage of the framework for the automobile emission control system showed that while existing doping test mechanisms generated test cases that have high variance and are impossible to be replicated in an actual deployment, the framework generated a test case that can be executed in a practical system.

To summarize, the present disclosure outlines the framework (CyPhyTest) that applies a novel methodology for ensuring physically-feasible test cases for CPS certification and one embodiment of the framework for detecting the automobile emission test cheating device. The framework may be applied to other cyber-physical systems such as medical control systems and navigation systems for unmanned aerial vehicles.

6. Methods

FIGS. 11A-11C show a method 300 for selecting input values of a test case input vector for CPS certification that satisfies constraints outlined herein by modification of a dynamic contract. The method 300 shows steps that correlate with the concepts outlined herein with respect to FIGS. 1-10B, especially with respect to FIGS. 3A and 3B showing the certification system 100 for implementation of aspects of the method 300. The functions performed in the processes and methods may be implemented in differing order. Furthermore, the outlined steps and operations are provided as examples, and some of the steps and operations may be optional, combined into fewer steps and operations, or expanded into additional steps and operations without detracting from the essence of the disclosed embodiments.

Method 300 begins at step 302 of FIG. 11A. Step 302 of method 300 includes accessing, at a processor in communication with a memory, a dynamic contract for certification of a cyber-physical system, the dynamic contract including:

a) information descriptive of a dynamical cyber-physical interaction model of the cyber-physical system that characterizes interactions between a set of state variables of the dynamical cyber-physical interaction model;

b) an input space descriptive of an acceptable range of input values for construction of an input vector associated with the dynamical cyber-physical interaction model; and c) an output space descriptive of an acceptable range of output values of an output vector associated with the dynamical cyber-physical interaction model.

The dynamical cyber-physical interaction model represents interactions between a controller of the cyber-physical system and a physical system of the cyber-physical system. The input vector can be an input to the dynamical cyber-physical interaction model for an n$^{th}$ time step and the output vector can be an output of the dynamical cyber-physical interaction model for the n$^{th}$ time step that corresponds with the input vector.

In some examples corresponding to Sections 3-5, the cyber-physical system is a vehicle and where the dynamical cyber-physical interaction model characterizes interactions between a set of state variables of the vehicle. The input vector includes speed values applied to a controller of the vehicle and where the output vector includes emissions values generated by a physical system of the vehicle based on the input vector.

Step 304 of method 300 shown in FIG. 11A can include deriving a first threshold value for a first constraint based on the dynamical cyber-physical interaction model, the first threshold value defining a maximum allowable rate of change of an input vector, the rate of change of the input vector being defined in terms of interactions between the set of state variables of the dynamical cyber-physical interaction model. Step 306 of method 300 can include deriving a second threshold value for a second constraint based on the dynamical cyber-physical interaction model, the second threshold value defining a minimum allowable time difference between two successive zero crossings of the output vector of the dynamical cyber-physical interaction model, the time difference between two successive zero crossings being defined in terms of interactions between the set of state variables of the dynamical cyber-physical interaction model and the input vector. FIG. 11A concludes at circle 11B and continues in FIG. 11B.

FIG. 11B starts at circle 11B. Step 308 of method 300 includes modifying, for an input vector and at the processor, the input space of the dynamic contract for an input vector and an output vector based on the set of state variables of the dynamical cyber-physical interaction model such that:

a) a rate of change of the input vector is below a first threshold value, the rate of change of the input vector being defined in terms of interactions between the set of state variables of the dynamical cyber-physical interaction model (e.g., subject to the first constraint regarding rate of change of the input vector discussed herein); and b) a time difference between two successive zero crossings of the output of the dynamical cyber-physical interaction model for the input vector is above a second threshold value associated with a simulation time step lower limit, the time difference between two successive zero crossings being defined in terms of interactions between the set of state variables of the dynamical cyber-physical interaction model and the input vector (e.g., subject to the second constraint regarding Zeno behavior of the output vector discussed herein).

In some aspects, modifying the input space of the contract based on the set of state variables with respect to the rate of change of the input vector avoids divergence of a corresponding output of the dynamical cyber-physical interaction model. Further, modifying the input space of the contract based on the set of state variables with respect to the time difference between two successive zero crossings avoids Zeno behavior of the dynamical cyber-physical interaction model near zero crossing events for a given initial condition of one or more state variables of the set of state variables of the dynamical cyber-physical interaction model.

Step 310 of method 300 includes searching, at the processor, the input space for input values of a test case input vector of a test case following modification of the input space of the dynamic contract, the test case satisfying the input space of the dynamic contract in terms of the dynamical cyber-physical interaction model and violating the output space of the dynamic contract. Step 310 can include various sub-steps, shown as steps 312-320 of method 300. Step 312 is shown in FIG. 11B and includes applying a labeled transition system satisfiability algorithm (or another suitable methodology) to the input vector to determine suitability of the input vector for inclusion within the test case input vector. FIG. 11B concludes at circle 11C, and steps 314-322 are shown starting at circle 11C in FIG. 11C.

FIG. 11C starts at circle 11C, which continues the various sub-steps of step 312 discussed with reference to FIG. 11B. Step 314 of method 300 includes determining a rate of change of the input vector based on the dynamical cyber-physical interaction model. Step 316 of method 300 includes rejecting, at the processor, the input vector for inclusion within the test case input vector where the rate of change of the input vector is above the first threshold value. Step 318 of method 300 includes determining a time difference between two successive zero crossings of the output vector of the dynamical cyber-physical interaction model that results from the input vector. Step 320 of method 300 includes rejecting, at the processor, the input vector for inclusion within the test case input vector where the time difference between two successive zero crossings of the output vector of the dynamical cyber-physical interaction model is below the second threshold value.

Step 322 of method 300 includes selecting, at the processor, the input values of the test case input vector of the test case for application to the cyber-physical system that satisfy the input space of the dynamic contract in terms of the dynamical cyber-physical interaction model. In some examples, the input values of the test case input vector cause the test case to violate the output space of the dynamic contract—in such a scenario, this can indicate that the cyber-physical system may not meet requirements for certification as there may be cheating involved, the dynamical cyber-physical interaction model may not be appropriately characterized, or there are problems with the cyber-physical system itself. However, when testing a cyber-physical system that meets requirements for certification, the test case (including inputs and outputs) may satisfy both the input space and the output space defined within the dynamic contract.

Further steps can include applying the test case input vector to the cyber-physical system as input, and receiving a test case output vector having output values associated with the cyber-physical system as a result of the test case input vector. The output values of the test case output vector can be compared with the output vector of the dynamical cyber-physical interaction model that result from application of an input vector corresponding with the test case input vector. If there are significant discrepancies between the test case output vector obtained from the cyber-physical system and the output vector of the dynamical cyber-physical interaction model, then this can indicate that the cyber-physical system may not meet requirements for certification for one or more reasons as discussed above.

In some examples, the method 300 outlined in FIGS. 11A-11C, as well as the certification system 100 discussed with respect to FIGS. 1A-10B, can be applied before, during or after deployment of the cyber-physical system. For example, test cases may be generated and evaluated with respect to the dynamic contract immediately after deployment of an updated dynamical cyber-physical interaction model and/or upon updating aspects of the cyber-physical system itself to find test cases that violate the output space. Evaluation of the dynamical cyber-physical interaction model with respect to the dynamic contract can be continually re-applied especially for cyber-physical systems employing machine-learning principles to ensure compliance and proper functionality, e.g., each time a governing model of the cyber-physical system is re-trained or otherwise adjusted.

7. Computing Device

Figure 12:
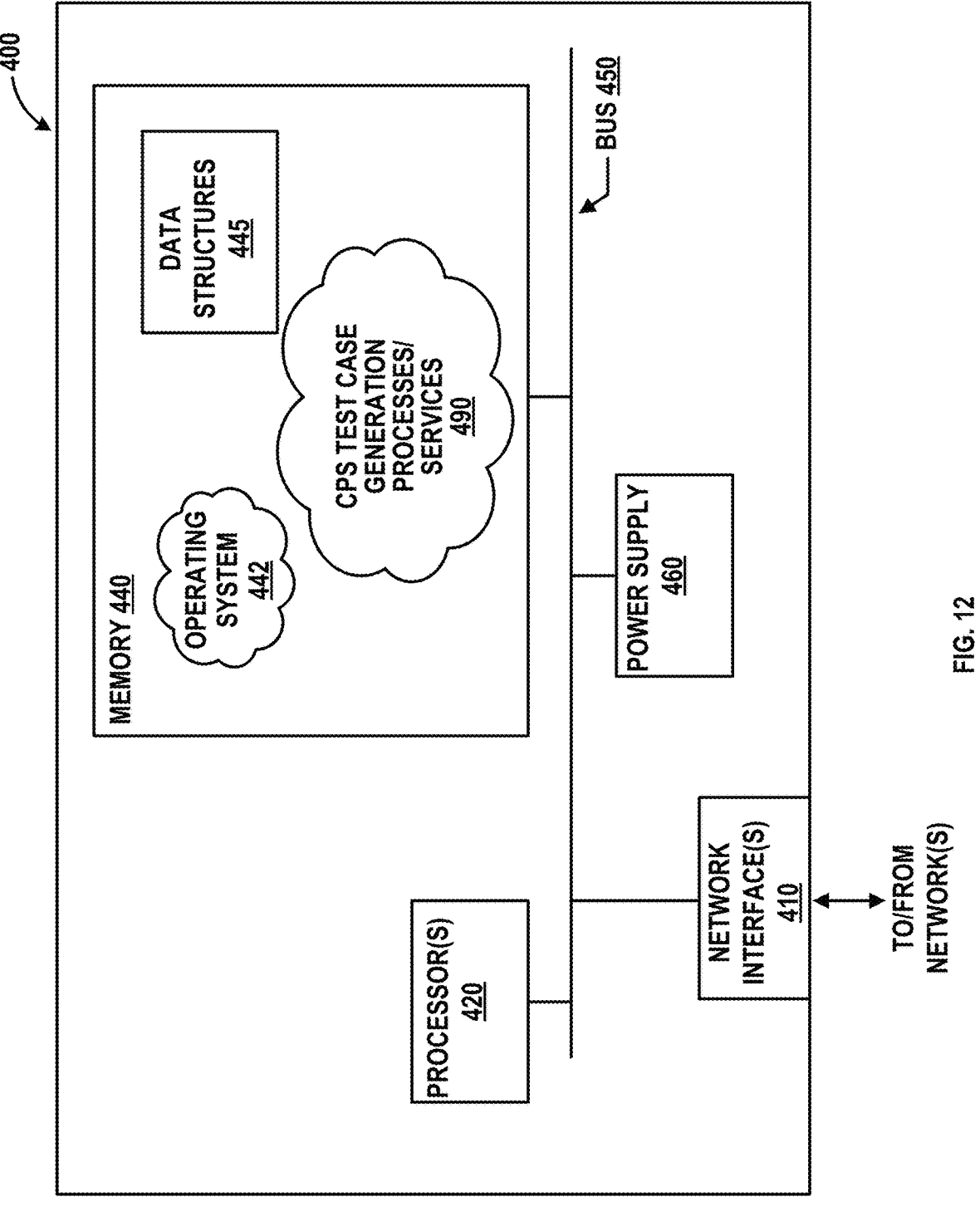
FIG. 12 is a simplified diagram showing an example computing device for implementation of the system of FIGS. 3A and 3B.

FIG. 12 is a schematic block diagram of an example device 400 that may be used with one or more embodiments described herein, e.g., as a component of the certification system 100 shown in FIGS. 3A and 3B and implementing aspects of method 300 shown in FIGS. 11A-11C.

Device 400 comprises one or more network interfaces 410 (e.g., wired, wireless, PLC, etc.), at least one processor 420, and a memory 440 interconnected by a system bus 450, as well as a power supply 460 (e.g., battery, plug-in, etc.).

Network interface(s) 410 include the mechanical, electrical, and signaling circuitry for communicating data over the communication links coupled to a communication network. Network interfaces 410 are configured to transmit and/or receive data using a variety of different communication protocols. As illustrated, the box representing network interfaces 410 is shown for simplicity, and it is appreciated that such interfaces may represent different types of network connections such as wireless and wired (physical) connections. Network interfaces 410 are shown separately from power supply 460, however it is appreciated that the interfaces that support PLC protocols may communicate through power supply 460 and/or may be an integral component coupled to power supply 460.

Memory 440 includes a plurality of storage locations that are addressable by processor 420 and network interfaces 410 for storing software programs and data structures associated with the embodiments described herein. In some embodiments, device 400 may have limited memory or no memory (e.g., no memory for storage other than for programs/processes operating on the device and associated caches). Memory 440 can include instructions executable by the processor 420 that, when executed by the processor 420, cause the processor 420 to implement aspects of the certification system 100 and the method 300 outlined herein. In some examples, the memory 440 can be a non-transitory computer-readable medium. In some embodiments the computer-readable storage devices, mediums, and memories can include a cable or wireless signal including a bit stream and the like.

Processor 420 comprises hardware elements or logic adapted to execute the software programs (e.g., instructions) and manipulate data structures 445. An operating system 442, portions of which are typically resident in memory 440 and executed by the processor, functionally organizes device 400 by, inter alia, invoking operations in support of software processes and/or services executing on the device. These software processes and/or services may include CPS test case generation processes/services 490, which can include aspects of method 300 and/or implementations of various modules described herein. Note that while CPS test case generation processes/services 490 is illustrated in centralized memory 440, alternative embodiments provide for the process to be operated within the network interfaces 410, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the CPS test case generation processes/services 490 is shown as a standalone process, those skilled in the art will appreciate that this process may be executed as a routine or module within other processes.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:

a processor in communication with a memory and including instructions executable by the processor to:

access, at the processor, contract information of a dynamic contract defining a reference model, an input space, and an output space of a contract for certification of a cyber-physical system, the contract information including:

information descriptive of a dynamical cyber-physical interaction model of the cyber-physical system that characterizes interactions between a set of state variables that describe an operation of the cyber-physical system;

information descriptive of an input space for construction of an input vector associated with the dynamical cyber-physical interaction model; and information descriptive of an output space of an output vector associated with the dynamical cyber-physical interaction model;

simulate, at the processor, the dynamical cyber-physical interaction model for a plurality of time steps using a candidate input vector to generate a corresponding candidate output vector;

modify, at the processor, the input space of the contract information for an input vector and for an output vector that corresponds with the input vector based on the set of state variables of the dynamical cyber-physical interaction model such that:

a rate of change of the input vector is below a first threshold value, the rate of change of the input vector being defined in terms of interactions between the set of state variables of the dynamical cyber-physical interaction model and being computed from differences between input values of the input vector at two simulation time steps; and a time difference between two successive zero crossings of the output vector of the dynamical cyber-physical interaction model is above a second threshold value associated with a simulation time step lower limit, the time difference between two successive zero crossings being defined in terms of interactions between the set of state variables of the dynamical cyber- physical interaction model and the input vector and being computed by detecting successive sign changes of the candidate output vector across simulation time steps; and reject, at the processor, the candidate input vector for inclusion within a test case input vector when the computed rate of change is above the first threshold value or when the computed time difference between two successive zero crossings is below the second threshold value, and regenerate a further candidate input vector for evaluation; and select, at the processor, input values of a test case input vector of a test case for application to the cyber-physical system that satisfies the input space of the contract in terms of the dynamical cyber-physical interaction model after modification of the input space and rejection of candidate input vectors that violate the first threshold value or the second threshold value;

apply the test case input vector to the cyber-physical system to generate a test case output vector;

determine a distance between a candidate output vector corresponding to the test case input vector and the test case output vector; and detect the presence of software doping mischaracterization of the dynamical cyber-physical interaction model, or an unintentional software-configuration change within the cyber-physical system where the distance between the candidate output vector and test case output vector exceeds a threshold value.

2. The system of claim 1, where the dynamical cyber-physical interaction model represents interactions between a controller of the cyber-physical system and a physical system of the cyber-physical system.

3. The system of claim 1, where modification of the input space of the contract based on the set of state variables with respect to the time difference between two successive zero crossings avoids Zeno behavior of the dynamical cyber-physical interaction model near zero crossing events for a given initial condition of one or more state variables of the set of state variables of the dynamical cyber-physical interaction model.

4. The system of claim 1, where modification of the input space of the contract based on the set of state variables with respect to the rate of change of the input vector avoids divergence of a corresponding output of the dynamical cyber-physical interaction model.

5. The system of claim 1, where the input vector being an input to the dynamical cyber-physical interaction model for an nth time step and the output vector being an output of the dynamical cyber-physical interaction model for the nth time step that corresponds with the input vector.

6. The system of claim 1, the memory further including instructions executable by the processor to:

search, at the processor, the input space for the input values of the test case input vector of the test case following modification of the input space of the contract information, the test case satisfying the input space of the contract information in terms of the dynamical cyber-physical interaction model and violating the output space of the contract information.

7. The system of claim 6, searching the input space for input values of the test case input vector of the test case includes applying a labeled transition system satisfiability algorithm to the input vector to determine suitability of the input vector for inclusion within the test case input vector.

8. The system of claim 1, the memory further including instructions executable by the processor to:

reject, at the processor, the input vector for inclusion within the test case input vector where the rate of change of the input vector is above the first threshold value.

9. The system of claim 1, the memory further including instructions executable by the processor to:

reject, at the processor, the input vector for inclusion within the test case input vector where the time difference between two successive zero crossings of the output vector of the dynamical cyber-physical interaction model is below the second threshold value.

10. The system of claim 1, where the cyber-physical system is a vehicle and where the dynamical cyber-physical interaction model characterizes interactions between a set of state variables of the vehicle.

11. The system of claim 10, where the input vector includes speed values applied to a controller of the vehicle and where the output vector includes emissions values generated by a physical system of the vehicle based on the input vector.

12. A method, comprising:

accessing, at a processor in communication with a memory, contract information for certification of a cyber-physical system, the contract information including:

information descriptive of a dynamical cyber-physical interaction model of the cyber-physical system that characterizes interactions between a set of state variables that describe operation of the cyber-physical system;

information descriptive of an input space for construction of an input vector associated with the dynamical cyber-physical interaction model; and information descriptive of an output space of an output vector associated with the dynamical cyber-physical interaction model;

simulating, at the processor, the dynamical cyber-physical interaction model for a plurality of time steps using a candidate input vector to generate a corresponding candidate output vector;

modifying, at the processor, the input space of the contract information for an input vector and for an output vector that corresponds with the input vector based on the set of state variables of the dynamical cyber-physical interaction model such that:

a rate of change of the input vector is below a first threshold value, the rate of change of the input vector being defined in terms of interactions between the set of state variables of the dynamical cyber-physical interaction model and being computed from differences between input values of the candidate input vector at two simulation time steps; and a time difference between two successive zero crossings of the output vector of the dynamical cyber-physical interaction model is above a second threshold value associated with a simulation time step lower limit, the time difference between two successive zero crossings being defined in terms of interactions between the set of state variables of the dynamical cyber-physical interaction model and the input vector $x$ and being computed by detecting successive sign changes of the candidate output vector across simulation time steps, rejecting, at the processor, the candidate input vector where the computed rate of change is above the first threshold value or where the computed time difference between two successive zero crossings is below the second threshold value, and regenerating a further candidate input vector for evaluation; and selecting, at the processor, input values of a test case input vector of a test case for application to the cyber-physical system that satisfies the input space of the contract information in terms of the dynamical cyber-physical interaction model after modification of the input space and rejection of candidate input vectors that violate the first threshold value or the second threshold value, wherein application of the test case input vector to the cyber-physical system enables detection of software doping mischaracterization of the dynamical cyber-physical interaction model, or an unintentional software-configuration change based on an output discrepancy between the cyber-physical system and the dynamical cyber-physical interaction model.

13. The method of claim 12, where the dynamical cyber-physical interaction model represents interactions between a controller of the cyber-physical system and a physical system of the cyber-physical system.

14. The method of claim 12, where modifying the input space of the contract information based on the set of state variables with respect to the time difference between two successive zero crossings avoids Zeno behavior of the dynamical cyber-physical interaction model near zero crossing events for a given initial condition of one or more state variables of the set of state variables of the dynamical cyber-physical interaction model.

15. The method of claim 12, where modifying the input space of the contract information based on the set of state variables with respect to the rate of change of the input vector avoids divergence of a corresponding output of the dynamical cyber-physical interaction model.

16. The method of claim 12, the input vector being an input to the dynamical cyber-physical interaction model for an nth time step and the output vector being an output of the dynamical cyber-physical interaction model for the nth time step that corresponds with the input vector.

17. The method of claim 12, further comprising:

searching, at the processor, the input space for the input values of the test case input vector of the test case following modification of the input space of the contract information, the test case satisfying the input space of the contract information in terms of the dynamical cyber-physical interaction model and violating the output space of the contract information.

18. The method of claim 17, wherein searching the input space for input values of the test case input vector of the test case includes applying a labeled transition system satisfiability algorithm to the input vector to determine suitability of the input vector for inclusion within the test case input vector.

19. The method of claim 12, further comprising:

rejecting, at the processor, the input vector for inclusion within the test case input vector where the rate of change of the input vector is above the first threshold value.

* * * * *